US010678322B2

(12) United States Patent
Baldwin et al.

(10) Patent No.: US 10,678,322 B2
(45) Date of Patent: Jun. 9, 2020

(54) PRESSURE SENSING VIA BONE CONDUCTION

(71) Applicant: AT&T Intellectual Property I, L.P., Atlanta, GA (US)

(72) Inventors: Christopher Baldwin, Algonquin, IL (US); Brian S. Amento, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 83 days.

(21) Appl. No.: 14/083,094

(22) Filed: Nov. 18, 2013

(65) Prior Publication Data

US 2015/0138062 A1 May 21, 2015

(51) Int. Cl.
*G06F 3/041* (2006.01)
*G06F 3/01* (2006.01)

(52) U.S. Cl.
CPC ............ *G06F 3/011* (2013.01); *G06F 3/0414* (2013.01); *G06F 2203/04105* (2013.01)

(58) Field of Classification Search
CPC .................. G06F 3/011; G06F 3/0487; G06F 2203/04105; G06F 3/0414; G06F 3/041
See application file for complete search history.

(56) References Cited

U.S. PATENT DOCUMENTS 3,629,521 A 12/1971 Puharich et al.
4,048,986 A 9/1977 Ott
4,340,778 A 7/1982 Cowans et al.
4,421,119 A 12/1983 Pratt, Jr.
4,720,607 A 1/1988 de Moncuit
4,754,763 A 7/1988 Doemland
4,799,498 A 1/1989 Collier
4,988,981 A 1/1991 Zimmerman et al.
(Continued)

FOREIGN PATENT DOCUMENTS

AU 2007200415 8/2007
CA 1207883 7/1986
(Continued)

OTHER PUBLICATIONS

"Electrodermal activity," Wikipedia, https://en.wikipedia.org/wiki/Electrodermal_activity, Jan. 6, 2019, 5 pages.*
(Continued)

*Primary Examiner* — Jeff Piziali
(74) *Attorney, Agent, or Firm* — Hartman & Citrin LLC

(57) ABSTRACT

Concepts and technologies are disclosed herein for pressure sensing via bone conduction. According to one aspect, a device can receive a modified signal after a signal has propagated through a body of a user and a surface with which the user is in contact. The modified signal can include the signal as modified by the body of the user and the surface. The device can compare the modified signal to a baseline signal. The device can determine, based upon the comparison of the modified signal to the baseline signal, a change between the modified signal and the baseline signal. The device can determine, based upon the change between the modified signal and the baseline signal, a pressure applied by the user to the surface. The pressure can be used for various applications.

13 Claims, 12 Drawing Sheets

(56) References Cited

U.S. PATENT DOCUMENTS

| | | |
|---|---|---|
| 5,024,239 A | 6/1991 | Rosenstein |
| 5,073,950 A | 12/1991 | Colbert et al. |
| 5,125,313 A | 6/1992 | Hiyoshi et al. |
| 5,319,747 A | 6/1994 | Gerrissen et al. |
| 5,327,506 A | 7/1994 | Stites, III |
| 5,368,044 A | 11/1994 | Cain et al. |
| 5,495,241 A | 2/1996 | Doing et al. |
| 5,615,681 A | 4/1997 | Ohtomo |
| 5,664,227 A | 9/1997 | Mauldin et al. |
| 5,720,290 A | 2/1998 | Buhler |
| 5,749,363 A | 5/1998 | Ishii |
| 5,750,941 A | 5/1998 | Ishikawa et al. |
| 5,766,208 A | 6/1998 | Mcewan |
| 5,810,731 A | 9/1998 | Sarvazyan et al. |
| 5,813,406 A | 9/1998 | Kramer et al. |
| 5,836,876 A | 11/1998 | Dimarogonas |
| 6,024,711 A | 2/2000 | Lentle |
| 6,115,482 A | 9/2000 | Sears et al. |
| 6,135,951 A | 10/2000 | Richardson et al. |
| 6,151,208 A | 11/2000 | Bartlett |
| 6,154,199 A | 11/2000 | Butler |
| 6,213,934 B1 | 4/2001 | Bianco |
| 6,234,975 B1 | 5/2001 | Mcleod et al. |
| 6,335,723 B1 | 1/2002 | Wood et al. |
| 6,336,045 B1 | 1/2002 | Brooks |
| 6,380,923 B1 | 4/2002 | Fukumoto et al. |
| 6,396,930 B1 | 5/2002 | Vaudrey et al. |
| 6,409,684 B1 | 6/2002 | Wilk |
| 6,414,673 B1 | 7/2002 | Wood et al. |
| 6,507,662 B1 | 1/2003 | Brooks |
| 6,515,669 B1 | 2/2003 | Mohri |
| 6,580,356 B1 | 6/2003 | Alt et al. |
| 6,589,287 B2 | 7/2003 | Lundborg |
| 6,631,197 B1 | 10/2003 | Taenzer |
| 6,754,472 B1 | 6/2004 | Williams et al. |
| 6,783,501 B2 | 8/2004 | Takahashi et al. |
| 6,798,403 B2 | 9/2004 | Kitada et al. |
| 6,844,660 B2 | 1/2005 | Scott |
| 6,898,299 B1 | 5/2005 | Brooks |
| 6,912,287 B1 | 6/2005 | Fukumoto et al. |
| 7,010,139 B1 | 3/2006 | Smeehuyzen |
| 7,123,752 B2 | 10/2006 | Kato et al. |
| 7,148,879 B2 | 12/2006 | Amento et al. |
| 7,198,607 B2 | 4/2007 | Jamsen |
| 7,206,423 B1 | 4/2007 | Feng et al. |
| 7,232,416 B2 | 6/2007 | Czernicki |
| 7,370,208 B2 | 5/2008 | Levin et al. |
| 7,405,725 B2 | 7/2008 | Mohri et al. |
| 7,536,557 B2 | 5/2009 | Murakami et al. |
| 7,539,533 B2 | 5/2009 | Tran |
| 7,615,018 B2 | 11/2009 | Nelson et al. |
| 7,625,315 B2 | 12/2009 | Hickman |
| 7,648,471 B2 | 1/2010 | Hobson |
| 7,671,351 B2 | 3/2010 | Setlak et al. |
| 7,708,697 B2 | 5/2010 | Wilkinson et al. |
| 7,760,918 B2 | 7/2010 | Bezvershenko et al. |
| 7,778,848 B1 | 8/2010 | Reeves |
| 7,796,771 B2 | 9/2010 | Calhoun et al. |
| 7,878,075 B2 | 2/2011 | Johansson et al. |
| 7,914,468 B2 | 3/2011 | Shalon et al. |
| 7,918,798 B2 | 4/2011 | Wu |
| 8,023,669 B2 | 9/2011 | Segev et al. |
| 8,023,676 B2 | 9/2011 | Abolfathi et al. |
| 8,031,046 B2 | 10/2011 | Franza et al. |
| 8,098,129 B2 | 1/2012 | Falck et al. |
| 8,196,470 B2 | 6/2012 | Gross et al. |
| 8,200,289 B2 | 6/2012 | Joo et al. |
| 8,253,693 B2 | 8/2012 | Buil et al. |
| 8,270,637 B2 | 9/2012 | Abolfathi |
| 8,270,638 B2 | 9/2012 | Abolfathi et al. |
| 8,312,660 B1 | 11/2012 | Fujisaki |
| 8,330,744 B2 | 12/2012 | Nikolovski et al. |
| 8,348,936 B2 | 1/2013 | Trembly et al. |
| 8,421,634 B2 | 4/2013 | Tan et al. |
| 8,467,742 B2 | 6/2013 | Hachisuka et al. |
| 8,482,488 B2 | 7/2013 | Jannard |
| 8,491,446 B2 | 7/2013 | Hinds et al. |
| 8,500,271 B2 | 8/2013 | Howell et al. |
| 8,521,239 B2 | 8/2013 | Hosoi et al. |
| 8,540,631 B2 | 9/2013 | Penner et al. |
| 8,542,095 B2 | 9/2013 | Kamei |
| 8,560,034 B1 | 10/2013 | Diab et al. |
| 8,594,568 B2 | 11/2013 | Falck |
| 8,750,852 B2 | 6/2014 | Forutanpour et al. |
| 8,922,427 B2 | 12/2014 | Dehnie et al. |
| 9,031,293 B2 | 5/2015 | Kalinli-Akbacak |
| 9,386,962 B2 | 7/2016 | Dahl |
| 9,600,079 B2 | 3/2017 | Baldwin et al. |
| 2001/0013546 A1 | 8/2001 | Ross |
| 2001/0051776 A1 | 12/2001 | Lenhardt |
| 2003/0048915 A1 | 3/2003 | Bank |
| 2003/0066882 A1 | 4/2003 | Ross |
| 2003/0125017 A1 | 7/2003 | Greene et al. |
| 2003/0133008 A1 | 7/2003 | Stephenson |
| 2004/0152440 A1 | 8/2004 | Yoda et al. |
| 2005/0207599 A1 | 9/2005 | Fukumoto et al. |
| 2005/0210269 A1 | 9/2005 | Tiberg |
| 2006/0018488 A1 | 1/2006 | Viala et al. |
| 2006/0132455 A1* | 6/2006 | Rimas-Ribikauskas ............ G06F 3/0414 345/173 |
| 2006/0139339 A1 | 6/2006 | Pechman et al. |
| 2006/0149337 A1 | 7/2006 | John |
| 2007/0012507 A1 | 1/2007 | Lyon |
| 2007/0142874 A1 | 6/2007 | John |
| 2008/0064955 A1 | 3/2008 | Miyajima |
| 2008/0084859 A1 | 4/2008 | Sullivan |
| 2008/0223925 A1 | 9/2008 | Saito et al. |
| 2008/0260211 A1 | 10/2008 | Bennett et al. |
| 2009/0149722 A1 | 6/2009 | Abolfathi et al. |
| 2009/0228791 A1* | 9/2009 | Kim ............ G06F 3/0414 715/702 |
| 2009/0234262 A1 | 9/2009 | Reid, Jr. et al. |
| 2009/0287485 A1 | 11/2009 | Glebe |
| 2009/0289958 A1 | 11/2009 | Kim et al. |
| 2009/0304210 A1 | 12/2009 | Weisman |
| 2009/0309751 A1 | 12/2009 | Kano et al. |
| 2010/0016741 A1 | 1/2010 | Mix et al. |
| 2010/0066664 A1 | 3/2010 | Son et al. |
| 2010/0137107 A1 | 6/2010 | Jamsa et al. |
| 2010/0162177 A1 | 6/2010 | Eves et al. |
| 2010/0168572 A1 | 7/2010 | Sliwa et al. |
| 2010/0220078 A1 | 9/2010 | Zloter et al. |
| 2010/0283745 A1 | 11/2010 | Nikolovski et al. |
| 2010/0286571 A1 | 11/2010 | Allum et al. |
| 2010/0297944 A1 | 11/2010 | Lee |
| 2010/0315206 A1 | 12/2010 | Schenk et al. |
| 2010/0316235 A1 | 12/2010 | Park et al. |
| 2010/0328033 A1 | 12/2010 | Kamei |
| 2011/0022025 A1 | 1/2011 | Savoie et al. |
| 2011/0125063 A1 | 5/2011 | Shalon et al. |
| 2011/0134030 A1 | 6/2011 | Cho |
| 2011/0135106 A1 | 6/2011 | Yehuday et al. |
| 2011/0137649 A1 | 6/2011 | Rasmussen et al. |
| 2011/0152637 A1 | 6/2011 | Kateraas et al. |
| 2011/0155479 A1* | 6/2011 | Oda ............ G06F 3/03545 178/18.06 |
| 2011/0227856 A1 | 9/2011 | Corroy et al. |
| 2011/0245669 A1 | 10/2011 | Zhang |
| 2011/0255702 A1 | 10/2011 | Jensen |
| 2011/0260830 A1* | 10/2011 | Weising ............ G06F 3/015 340/5.52 |
| 2011/0269601 A1 | 11/2011 | Nelson et al. |
| 2011/0276312 A1 | 11/2011 | Shalon |
| 2011/0280239 A1 | 11/2011 | Tung et al. |
| 2011/0282662 A1 | 11/2011 | Aonuma et al. |
| 2012/0010478 A1 | 1/2012 | Kinnunen et al. |
| 2012/0011990 A1 | 1/2012 | Mann |
| 2012/0058859 A1 | 3/2012 | Elsom-Cook et al. |
| 2012/0065477 A1 | 3/2012 | Enomoto |
| 2012/0065506 A1 | 3/2012 | Smith |
| 2012/0143693 A1 | 6/2012 | Chung et al. |
| 2012/0202479 A1 | 8/2012 | Sugitani et al. |
| 2012/0212441 A1 | 8/2012 | Christiansson et al. |

(56) References Cited

U.S. PATENT DOCUMENTS

| | | |
|---|---|---|
| 2012/0280900 A1 | 11/2012 | Wang et al. |
| 2012/0290832 A1 | 11/2012 | Antequera Rodriguez et al. |
| 2013/0034238 A1 | 2/2013 | Abolfathi |
| 2013/0041235 A1 | 2/2013 | Rogers et al. |
| 2013/0097292 A1 | 4/2013 | Yoakum et al. |
| 2013/0119133 A1 | 5/2013 | Michael et al. |
| 2013/0120458 A1 | 5/2013 | Celebisoy et al. |
| 2013/0135223 A1 | 5/2013 | Shai |
| 2013/0142363 A1 | 6/2013 | Amento et al. |
| 2013/0170471 A1 | 7/2013 | Nix |
| 2013/0171599 A1 | 7/2013 | Bleich et al. |
| 2013/0173926 A1 | 7/2013 | Morese et al. |
| 2013/0212648 A1 | 8/2013 | Tietjen et al. |
| 2013/0215060 A1 | 8/2013 | Nakamura |
| 2013/0225915 A1 | 8/2013 | Redfield et al. |
| 2013/0225940 A1 | 8/2013 | Fujita et al. |
| 2013/0257804 A1 | 10/2013 | Vu et al. |
| 2013/0278396 A1 | 10/2013 | Kimmel |
| 2013/0288655 A1 | 10/2013 | Foruntanpour et al. |
| 2013/0346620 A1 | 12/2013 | Gizis et al. |
| 2014/0009262 A1 | 1/2014 | Robertson et al. |
| 2014/0028604 A1 | 1/2014 | Morinaga et al. |
| 2014/0035884 A1 | 2/2014 | Oh et al. |
| 2014/0097608 A1 | 4/2014 | Buzhardt et al. |
| 2014/0099991 A1 | 4/2014 | Cheng et al. |
| 2014/0107531 A1 | 4/2014 | Baldwin |
| 2014/0156854 A1 | 6/2014 | Gaetano, Jr. |
| 2014/0168093 A1* | 6/2014 | Lawrence ............ G06F 3/0414 345/173 |
| 2014/0168135 A1 | 6/2014 | Saukko et al. |
| 2014/0174174 A1 | 6/2014 | Uehara et al. |
| 2014/0188561 A1 | 7/2014 | Tenbrock et al. |
| 2014/0210791 A1 | 7/2014 | Hanauer et al. |
| 2014/0240124 A1 | 8/2014 | Bychkov |
| 2015/0084011 A1 | 3/2015 | Park et al. |
| 2015/0092962 A1 | 4/2015 | Amento et al. |
| 2015/0105159 A1 | 4/2015 | Palotas |
| 2015/0120465 A1 | 4/2015 | Baldwin et al. |
| 2015/0128094 A1 | 5/2015 | Baldwin et al. |
| 2015/0137936 A1 | 5/2015 | Baldwin et al. |
| 2015/0137960 A1 | 5/2015 | Baldwin et al. |
| 2015/0150116 A1 | 5/2015 | Baldwin et al. |
| 2015/0199950 A1 | 7/2015 | Heiman et al. |
| 2015/0297140 A1 | 10/2015 | Hernandez et al. |
| 2016/0042228 A1 | 2/2016 | Opalka et al. |

FOREIGN PATENT DOCUMENTS

| | | |
|---|---|---|
| EP | 0712114 | 5/1996 |
| GB | 2226931 | 7/1990 |
| GB | 2348086 | 9/2000 |
| JP | 02249017 | 10/1990 |
| JP | 2003058190 | 2/2003 |
| JP | 2005142729 A | 6/2005 |
| JP | 2010210730 | 9/2010 |
| KR | 20100056688 | 5/2010 |
| TW | 200946887 | 8/1997 |
| WO | WO 8201329 | 4/1982 |
| WO | WO 9601585 | 1/1996 |
| WO | WO 2003033882 | 4/2003 |
| WO | WO 2006094372 | 9/2006 |
| WO | WO 2009001881 | 12/2008 |
| WO | WO 2010045158 | 4/2010 |
| WO | WO 2012168534 | 12/2012 |

OTHER PUBLICATIONS

U.S. Office Action dated Mar. 8, 2010 in U.S. Appl. No. 11/586,142.
U.S. Office Action dated Aug. 12, 2010 in U.S. Appl. No. 11/586,142.
Examiner's Answer to Appeal Brief dated Apr. 22, 2011 in U.S. Appl. No. 11/586,142.
Patent Board Decision on Appeal dated Sep. 25, 2014 in U.S. Appl. No. 11/586,142.
Notice of Allowance dated Dec. 18, 2014 in U.S. Appl. No. 11/586,142.
Mujibiya, Adiyan, et al. "The sound of touch: on-body touch and gesture sensing based on transdermal ultrasound propagation." Proceedings of the 2013 ACM international conference on Interactive tabletops and surfaces. ACM, 2013.
Harrison, Chris, Robert Xiao, and Scott Hudson. "Acoustic barcodes: passive, durable and inexpensive notched identification tags." Proceedings of the 25th annual ACM symposium on User interface software and technology. ACM, 2012.
Yoo, Jerald, Namjun Cho, and Hoi-Jun Yoo. "Analysis of body sensor network using human body as the channel." Proceedings of the ICST 3rd international conference on Body area networks. ICST (Institute for Computer Sciences, Social-Informatics and Telecommunications Engineering), 2008.
Ni, Tao, and Patrick Baudisch. "Disappearing mobile devices." Proceedings of the 22nd annual ACM symposium on User interface software and technology. ACM, 2009.
Hinckley, Ken, and Hyunyoung Song, "Sensor synaesthesia: touch in motion, and motion in touch." Proceedings of the SIGCHI Conference on Human Factors in Computing Systems. ACM, 2011.
Hinge, Dhanashree, and S. D. Sawarkar. "Mobile to Mobile data transfer through Human Area Network." IJRCCT 2.11 (2013): 1181-1184.
Park, Duck Gun, et al. "TAP: touch-and-play." Proceedings of the SIGCHI conference on Human Factors in computing systems. ACM, 2006.
Ruiz, J. Agud, and Shigeru Shimamoto. "A study on the transmission characteristics of the human body towards broadband intrabody communications." Consumer Electronics, 2005.(ISCE 2005). Proceedings of the Ninth International Symposium on. IEEE, 2005.
Nagai, Ryoji, et al. "Near-Field Coupling Communication Technology for Human-Area Networking." Proc. Conf. on Information and Communication Technologies and Applications (ICTA2011), International Institute of Informatics and Systems (IIIS). 2012.
Lipkova, Jolana, and Jaroslav Cechak. "Transmission of Information Using the Human Body." IMCIC 2010.
Maruf, Md Hasan. "An Input Amplifier for Body-Channel Communication." (2013).
Rekimoto, Jun. "Gesturewrist and gesturepad: Unobtrusive wearable interaction devices." Wearable Computers, 2001. Proceedings. Fifth International Symposium on. IEEE, 2001.
Non-final Office Action dated Jan. 29, 2014 in U.S. Appl. No. 13/309,124.
Sang-Yoon Chang, et al., "Body Area Network Security: Robust Key Establishment Using Human Body Channel," retrieved from https://www.usenix.org/system/files/conference/healthsec12/healthsec12-final15.pdf on Oct. 16, 2013.
U.S. Office Action dated Dec. 17, 2015 in U.S. Appl. No. 14/065,663.
U.S. Office Action dated Nov. 19, 2015 in U.S. Appl. No. 14/083,499.
U.S. Office Action dated Nov. 19, 2015 in U.S. Appl. No. 14/090,668.
U.S. Office Action dated Jan. 11, 2016 in U.S. Appl. No. 14/514,658.
U.S. Office Action dated Apr. 7, 2017 in U.S. Appl. No. 14/065,663.
U.S. Office Action dated Jun. 1, 2017 in U.S. Appl. No. 14/482,078.
U.S. Office Action dated May 10, 2017 in U.S. Appl. No. 15/161,499.
U.S. Notice of Allowance dated Mar. 28, 2017 in U.S. Appl. No. 15/224,808.
U.S. Office Action dated Apr. 21, 2017 in U.S. Appl. No. 15/450,624.
U.S. Office Action dated Feb. 25, 2016 in U.S. Appl. No. 14/072,126.
U.S. Notice of Allowance dated Apr. 4, 2016 in U.S. Appl. No. 14/083,499.
U.S. Notice of Allowance dated Mar. 21, 2016 in U.S. Appl. No. 14/090,668.
U.S. Office Action dated Mar. 16, 2016 in U.S. Appl. No. 14/482,087.
U.S. Office Action dated Mar. 10, 2016 in U.S. Appl. No. 14/482,091.
U.S. Office Action dated Dec. 13, 2017 in U.S. Appl. No. 15/250,375.
U.S. Notice of Allowance dated Aug. 22, 2017 in U.S. Appl. No. 15/450,624.
Fukumoto et al., "Whisper: A Wristwatch Style Wearable Headset," CHI 99, May 1999, pp. 112-119.
Fukumoto et al., "Body Coupled FingeRing Wireless Wearable Keyboard," CHI 97, Mar. 1997, pp. 147-154.

(56) References Cited

OTHER PUBLICATIONS

Matsushita et al., "Wearable Key Device for Personalizing Nearby Environment, Proceedings of the Fourth International Symposium on Wearable Computers" (ISWC'00), Feb. 2000, pp. 1-8.
U.S. Office Action dated Oct. 20, 2016 in U.S. Appl. No. 14/482,078.
U.S. Office Action dated Dec. 14, 2016 in U.S. Appl. No. 14/561,549.
U.S. Notice of Allowance dated Oct. 7, 2016 in U.S. Appl. No. 15/224,808.
U.S. Notice of Allowance dated Aug. 21, 2017 in U.S. Appl. No. 14/065,663.
U.S. Notice of Allowance dated Nov. 17, 2017 in U.S. Appl. No. 14/482,101.
U.S. Office Action dated Aug. 25, 2015 in U.S. Appl. No. 11/586,142.
U.S. Office Action dated Jun. 25, 2015 in U.S. Appl. No. 14/083,110.
U.S. Appl. No. 14/482,087, filed Sep. 10, 2014.
U.S. Appl. No. 14/482,091, filed Sep. 10, 2014.
U.S. Appl. No. 14/482,101, filed Sep. 10, 2014.
U.S. Appl. No. 14/482,078, filed Sep. 10, 2014.
U.S. Office Action dated Jul. 7, 2016 in U.S. Appl. No. 14/072,126.
U.S. Notice of Allowance dated Jul. 12, 2016 in U.S. Appl. No. 14/482,091.
U.S. Office Action dated Sep. 14, 2016 in U.S. Appl. No. 14/482,101.
U.S. Office Action dated Aug. 17, 2016 in U.S. Appl. No. 15/161,499.
U.S. Office Action dated Apr. 5, 2018 in U.S. Appl. No. 15/250,375.
U.S. Office Action dated Mar. 22, 2018 in U.S. Appl. No. 15/450,624.
U.S. Office Action dated Jun. 11, 2019 in U.S. Appl. No. 16/403,685.
Zhong et al., "OsteoConduct: Wireless Body-Area Communication based on Bone Conduction," Proceeding of the ICST 2nd International Conference on Body Area Networks, BodyNets 2007.
Travis Deyle et al., "Hambone: A bio-acoustic gesture interface," 2007 11th IEEE International Symposium on Wearable Computers, 2007.
Scanlon, Michael V. Acoustic sensor for health status monitoring. Army Research Lab Aberdeen Proving Ground MD, 1998.
Lopez, et al., "New healthcare society supported by wearable sensors and information mapping-based services." International Journal of Networking and Virtual Organisations 9.3 (2011): 233-247.
Scanlon, Michael V. "Acoustic sensors in the helmet detect voice and physiology." AeroSense 2003. International Society for Optics and Photonics, 2003.
Kompis, Martin, and Rudolf Haeusler, "Electromagnetic interference of bone-anchored hearing aids by cellular phones revisited," Acta oto-laryngologica 122.5, 2002, 510-512.
Amento et al., "The Sound of One Hand: A Wrist-Mounted Bio-Acoustic Fingertip Gesture Interface," Short Talk: It's All About Sound, Apr. 20, 2002, 724-725, ACM, Minneapolis, Minnesota, USA.
"Kinect Gestures," retrieved from http://support.xbox.com/en-US/xbox-360/kinect/body-controller on Oct. 24, 2013.
Mark Billinghurst, "Chapter 14: Gesture Based Interaction," Haptic Input, Aug. 24, 2011.
Chris Harrison, Desney Tan, Dan Morris, "Skinput: Appropriating the Skin as an Interactive Canvas," CommuniCations of the ACM 54.8, 2011, 111-118.
T. Scott Saponas, et al., "Enabling always-available input with muscle-computer interfaces," Proceedings of the 22nd Annual ACM Symposium on User Interface Software and Technology, ACM, 2009.
Jao Henrique Donker, "The Body as a communication medium," 2009.
Vidya Bharrgavi, et al., "Security Solution for Data Integrity in Wireless BioSensor Networks," Distributed Computing Systems Workshops, 2007, ICDCSW'07, 27th International Conference, IEEE, 2007.
Daniel Halperin, et al., "Pacemakers and Implantable Cardiac Defibrillators: Software Radio Attacks and Zero-Power Defenses," Security and Privacy, SP 2008, IEEE Symposium, IEEE, 2008.
Carmen C. Y. Poon, et al., "A Novel Biometrics Method to Secure Wireless Body Area Sensor Networks for Telemedicine and M-Health," Communications Magazine, IEEE 44.4, 2006, 73-81.
Zicheng Liu, et al., "Direct Filtering for Air-and Bone-Conductive Microphones," Multimedia Signal Processing, 2004 IEEE 6th Workshop, IEEE, 2004.
U.S. Office Action dated Feb. 13, 2013 in U.S. Appl. No. 13/309,124.
U.S. Office Action dated Sep. 24, 2013 in U.S. Appl. No. 13/309,124.

\* cited by examiner

PRESSURE SENSING VIA BONE CONDUCTION

BACKGROUND

Pressure sensors are used in a variety of applications across a broad range of industries. The use of a pressure sensor for some applications is not feasible due to design constraints, cost constraints, and/or other factors that make it undesirable or impractical to use a pressure sensor, even when pressure measurements would be useful.

SUMMARY

Concepts and technologies are disclosed herein for pressure sensing via bone conduction. According to one aspect, a device can receive a modified signal after a signal has propagated through a body of a user and a surface with which the user is in contact. The modified signal can include the signal as modified by the body of the user and the surface. The device can compare the modified signal to a baseline signal. The device can determine, based upon the comparison of the modified signal to the baseline signal, a change between the modified signal and the baseline signal. The device can determine, based upon the change between the modified signal and the baseline signal, a pressure applied by the user to the surface.

In some embodiments, the device can receive the baseline signal from a source of the signal via a communication path external to the body of the user. In these embodiments, the signal source can send the signal to the body of the user and the baseline signal to the device concurrently.

In some embodiments, the device can generate a reference signal and send the reference signal to the body of the user so that the reference signal propagates through the body of the user and the surface. The device can receive a modified reference signal after the reference signal has propagated through the body of the user and the surface. The device can save the modified reference signal as the baseline signal for comparison to the modified signal. In some embodiments, the device can prompt the user to contact the surface without applying pressure to the surface prior to sending the reference signal to the body of the user.

In some embodiments, the device can observe a plurality of pressures applied to the surface by the user. The device can determine a minimum observed pressure and a maximum observed pressure of the plurality of pressures. The device can store the minimum observed pressure and the maximum observed pressure in association with the surface and the user.

In some embodiments, the surface is a component of the device. In some embodiments, the device can prompt the user to contact the surface and to perform an action to trigger a function of the surface. In these embodiments, the device can store the pressure applied by the user to the surface in association with the function. The device can identify a function degradation threshold for the function. The function degradation threshold can include a threshold pressure. The device can determine a subsequent pressure applied to the surface by the user. The device can determine that the subsequent pressure applied to the surface by the user at least meets the function degradation threshold. The device can generate an alert direct to an entity to inform the entity that the function degradation threshold has at least been met.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
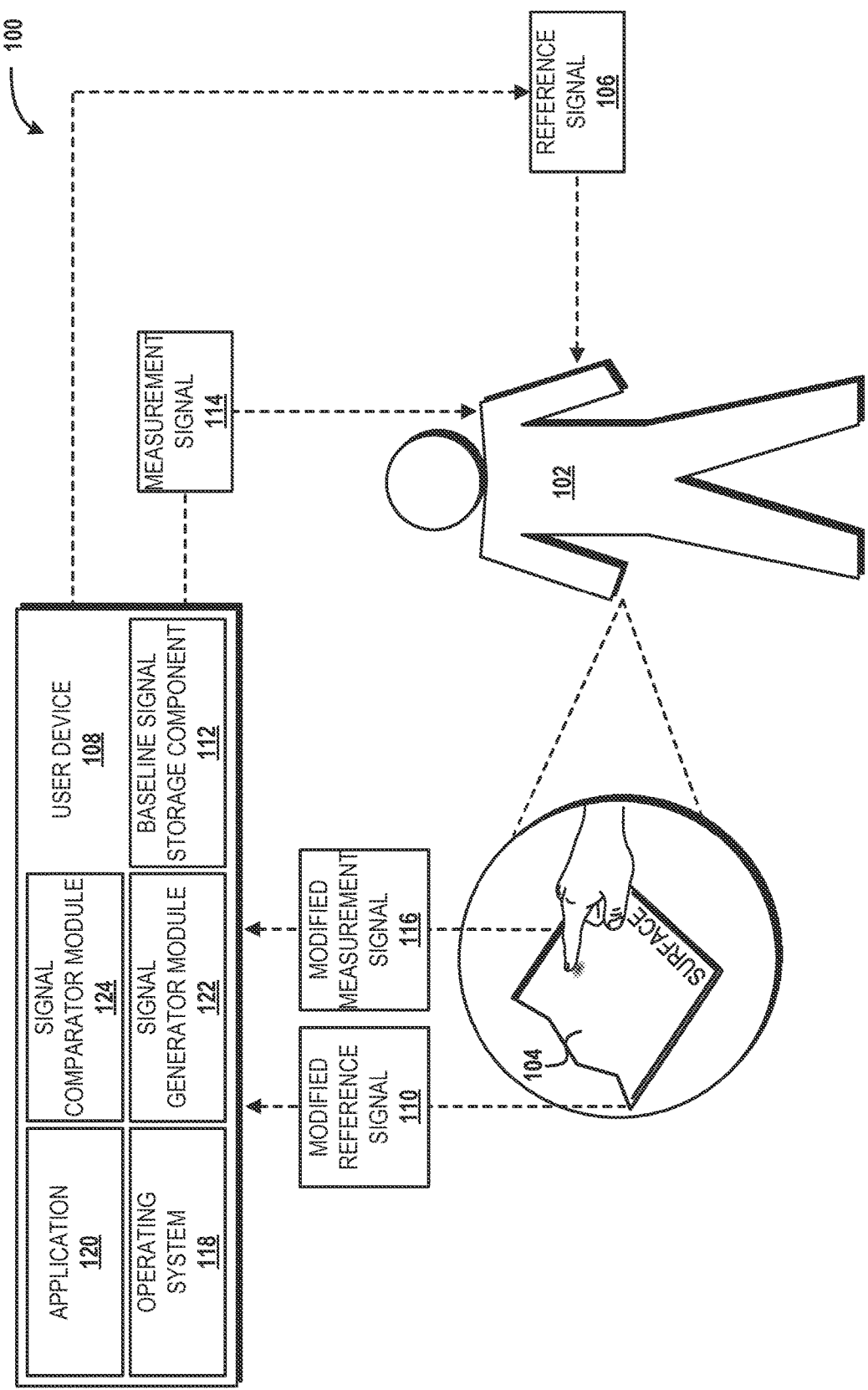
FIG. 1 is a block diagram illustrating aspects of an illustrative operating environment for various concepts disclosed herein, according to an illustrative embodiment.

The following detailed description is directed to pressure sensing via bone conduction. According to one aspect disclosed herein, an observed change in a received bone conduction signal is compared to a baseline to determine how much pressure a user is applying to a surface. As a user applies pressure to a surface, the skin between the surface and the user's bone is compressed. The compression of the user's skin results in at least two changes. The first change is the reduction of the distance between the source of the signal and the surface (and ultimately the receiver). The reduction of the distance between the source of the signal and the surface results in a shorter period of time for the signal to propagate through the user's body. The second change is the change in skin and soft tissue involvement in conducting the signal from the user's bone to the surface. Compressed skin and soft tissue is more rigid and has a noticeable effect on a signal propagating through the user's body. By considering the two aforementioned changes, a device can discern different levels of applied pressure during bone conduction signal exchanges. The concepts and technologies described herein for pressure sensing via bone conduction presents several potential applications, including applications that would otherwise require dedicated pressure sensor components.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer system configurations, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of disrupting bone conduction signals will be presented.

Referring now to FIG. 1, aspects of an operating environment 100 in which various embodiments presented herein may be implemented will be described, according to an illustrative embodiment. The operating environment 100 shown in FIG. 1 includes a user 102 in contact with a surface 104. The user's 102 body can receive a reference signal 106 from a user device 108. When the user 102 is in contact with the surface 104, the reference signal 106 can propagate through the user's 102 body into the surface 104. The reference signal 106 as modified by the user's 102 body and the surface 104 ("modified reference signal 110") when the user 102 is in contact with the surface 104 without applying pressure to the surface 104 can be captured by the user device 108. The modified reference signal 110 can be stored in a baseline signal storage component 112 of the user device 108. The modified reference signal 110 can be used by the user device 108 to establish a baseline signal that is indicative of a no-pressure state when the user 102 is in contact with the surface 104 without applying pressure to the surface 104.

The modified reference signal 110 can be compared to future signals, such as a measurement signal 114 as modified by the user's 102 body and the surface 104 ("modified measurement signal 116") when the user 102 is in contact with the surface 104 and applying pressure to the surface 104. The difference between one or more characteristics (e.g., frequency, amplitude, and/or phase) of the modified reference signal 110 (i.e., no-pressure state) and the modified measurement signal 116 (i.e., pressure state) can be associated with a change in pressure applied by the user 102 to the surface 104. The pressure applied by the user 102 to the surface 104 can be used by the user device 108 for various applications, including, for example: wear and tear detection of the surface 104 or a portion thereof; input to an application executing on the user device 108 or a remote device (not shown); control of one or more systems, such as, but not limited to, a robotic system used in surgical or other medical applications; context detection; and slip detection. The aforementioned applications will be described in greater detail below.

The surface 104 can be any surface to which a pressure can be applied by the user 102. In some embodiments, the surface 104 is the user device 108 or a component thereof, such as a housing, button, or display of the user device 108. In some other embodiments, the surface 104 is an input device or component thereof that is used to at least partially control an application that is executing on the user device 108 and/or another device with which the user device 108 is in communication. In some other embodiments, the surface 104 is a button, knob, lever, or any other object that, over time, experiences wear and tear, and, as a result, may cease to function properly or otherwise exhibit a degradation in performance.

The reference signal 106 and the measurement signal 114 each can be any signal that is capable of propagating through the user 102 via one or more of the user's 102 bones. The propagation of one or more signals through one or more bones of an individual, such as the user 102, is referred to herein as bone conduction. It should be understood that a portion of a given signal may propagate through other parts of the user's 102 body, such as soft tissue and/or skin, in addition to the user's 102 bones. The reference signal 106 and the measurement signal 114 can be generated to have any frequency, amplitude, and/or phase characteristics suitable for transmission through the user's 102 body and the surface 104. In some embodiments, the reference signal 106 and/or the measurement signal 114 are generated after a setup process during which the user device 108 transmits a plurality of signals through the user's 102 body and the surface 104 in order to determine signal characteristics that are suitable for transmission through the user's 102 body and the surface 104.

The user device 108 can be any computing device that is capable of generating a signal and sending the signal to the user's 102 body. The user device 108 may be a smartphone, feature phone, personal digital assistant ("PDA"), tablet device, laptop computer, desktop computer, server computer, video game system, handheld video game system, media player, set-top box, vehicle computing system, smart watch, personal tracker or safety device, other computing device, a combination thereof, or the like. It should be understood that the functionality of the user device 108 can be provided by a single device, by two or more similar devices, and/or by two or more dissimilar devices.

The user device 108 can include the baseline signal storage component 112 described above, an operating system 118, an application 120, a signal generator module 122, and a signal comparator module 124. The baseline signal storage component 112 can be any memory component of the user device 108 or a portion thereof that can store the modified reference signal 110. In some embodiments, the baseline signal storage component 112 stores multiple modified reference signals, each of which is associated with a different surface. In these embodiments, a surface identifier may be assigned to the surface 104 and any additional surfaces. In subsequent uses of the surface 104, the user 102 may provide input to the user device 108 to select the surface 104 from a list of available surfaces for which a modified reference signal is stored in the baseline signal storage component 112. In some other embodiments, the surface 104 can communicate with the user device 108 via a wireless and/or wired connection to provide the user device 108 with a corresponding surface identifier. In these embodiments, the user 102 need not provide any additional input to the user device 108 regarding the selection of the surface 104.

The operating system 118 is a program for controlling the operation of the user device 108. In some embodiments, the operating system 118 includes one or more settings for sensing a pressure applied by the user 102 to the surface 104. In these embodiments, the operating system 118 may include the signal generator module 122 and the signal comparator module 124 to carry out the operations of the pressure sensing function. The application 120 may receive pressure information from the operating system 118 and perform one or more operations in response thereto. Alternatively, the pressure sensing function may be performed by the application 120.

The application 120 includes computer-executable instructions that are configured to execute on top of the operating system 118 to cause the user device 108 to perform various functions. The application 120 may be any type of application, some examples of which include, but are not limited to, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The application 120 may perform a pressure sensing function and/or otherwise utilize pressure information to perform one or more operations.

The signal generator module 122 can be executed by one or more processors of the user device 108 (not illustrated in FIG. 1, but illustrated and described below with reference to FIG. 10) to generate the reference signal 106, the measurement signal 114, and, potentially, other signals used to measure a pressure applied by the user 102 to the surface 104. The signal generator module 122, in some embodiments, is included in the operating system 118 and accessible by one or more applications, such as the application 120, to cause the signal generator module 122 to generate one or more signals, such as the reference signal 106 and the measurement signal 114. In some other embodiments, the signal generator module 122 is included in the application 120.

The signal comparator module 124 can be executed by one or more processors of the user device 108 (not illustrated in FIG. 1, but illustrated and described below with reference to FIG. 10) to compare the modified reference signal 110 that is stored in the baseline signal storage component 112 to the modified measurement signal 116 to determine how much pressure the user 102 is applying to the surface 104. The signal comparator module 124, in some embodiments, is included in the operating system 118 and accessible by one or more applications, such as the application 120, to cause the signal comparator module 124 to compare the modified reference signal 110 that is stored in the baseline signal storage component 112 to the modified measurement signal 116 to determine how much pressure the user 102 is applying to the surface 104. In some other embodiments, the signal comparator module 124 is included in the application 120.

FIG. 1 illustrates one user 102, one surface 104, one reference signal 106, one user device 108, one modified reference signal 110, one baseline signal storage component 112, one measurement signal 114, one modified measurement signal 116, one operating system 118, one application 120, one signal generator module 122, and one signal comparator module 124. It should be understood, however, that various implementations of the operating environment 100 can include multiple users 102, multiple surfaces 104, multiple reference signals 106, multiple user devices 108, multiple modified reference signals 110, multiple baseline signal storage components 112, multiple measurement signals 114, multiple modified measurement signals 116, multiple operating systems 118, multiple applications 120, multiple signal generator modules 122, and/or multiple signal comparator modules 124. As such, the illustrated embodiment should be understood as being illustrative, and should not be construed as being limiting in any way.

Figure 2:
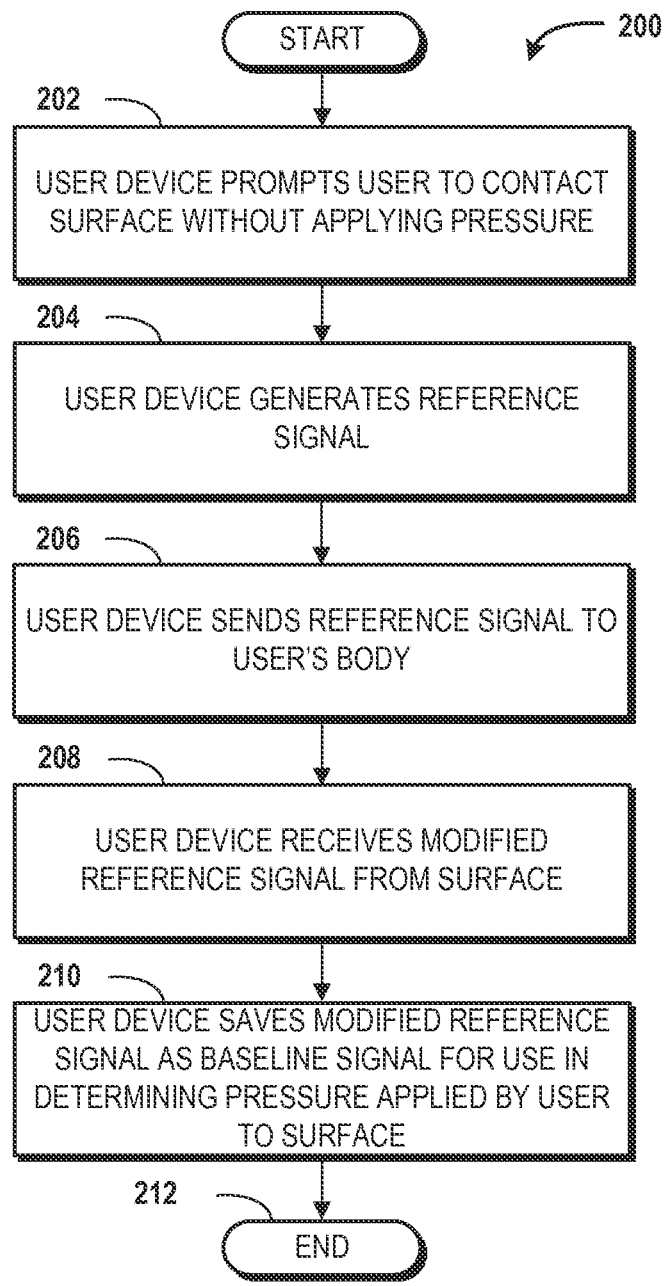
FIG. 2 is a flow diagram illustrating aspects of a method for generating a baseline signal for use determining a pressure applied by a user to a surface, according to an illustrative embodiment.

Turning now to FIG. 2, aspects of a method 200 for generating a baseline signal for use in determining a pressure applied by a user to a surface will be described in detail, according to an illustrative embodiment. It should be understood that the operations of the methods are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the user device 108, the surface 104, single-processor or multiprocessor systems, minicomputers, mainframe computers, personal computers, hand-held computing devices, microprocessor-based, programmable consumer electronics, other devices and systems disclosed herein, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing a processor of a computing system or device, such as the user device 108, another device disclosed herein, or another system disclosed herein, to perform one or more operations and/or causing the processor to direct other components of the computing system or device to perform one or more of the operations.

For purposes of illustrating and describing some of the concepts of the present disclosure, the methods disclosed herein are described as being performed, at least in part, by the user device 108 via execution of one or more software modules and/or software applications, such as, for example, the operating system 118, the application 120, the signal generator module 122, and/or the signal comparator module 124. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins at operation 202, where the user device 108 prompts the user 102 to contact the surface 104 without applying pressure. The user device 108 may prompt the user 102 to contact the surface 104 without applying pressure via a visual prompt on a display of the user device 108, via an audio prompt through a speaker of the user device 108, or a combination thereof. The user device 108 additionally may prompt the user 102 to provide information associated with one or more physical attributes of the user 102 as part of an initial setup process to determine signal characteristics for use in generating the reference signal 106. The physical attributes can include, but are not limited to, the user's weight, height, age, length of legs, length of arms, waist size, other dimensions of the user's 102 body or portions thereof, combinations thereof, or the like.

From operation 202, the method 200 proceeds to operation 204, where the user device 108 generates the reference signal 106. The user device 108 may generate the reference signal 106 with signal characteristics based upon the information provided by the user 102 as part of an initial setup process described above. From operation 204, the method 200 proceeds to operation 206, where the user device 108 sends the reference signal 106 to the user's 102 body. The reference signal 106 propagates through the user's 102 body and into the surface 104.

From operation 206, the method 200 proceeds to operation 208, where the user device 108 receives the modified reference signal 110 from the surface 104. From operation 208, the method 200 proceeds to operation 210, where the user device 108 saves the modified reference signal 110 as a baseline signal in the baseline signal storage component 112 for use in determining a pressure applied by the user 102 to the surface 104.

From operation 210, the method 200 proceeds to operation 212. The method 200 ends at operation 212.

Figure 3:
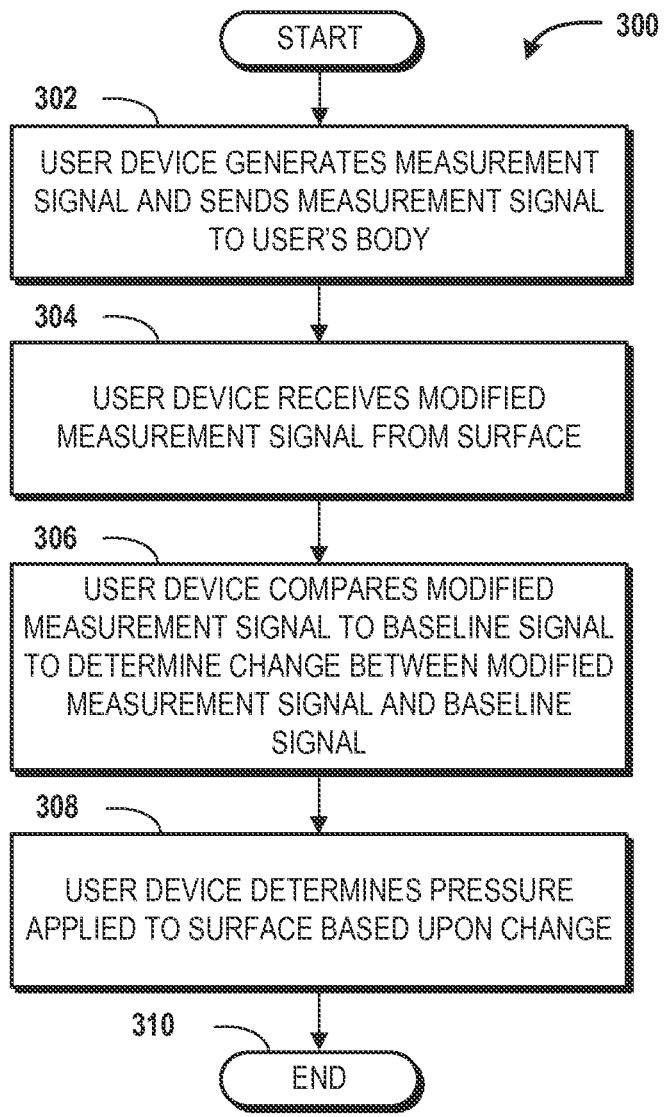
FIG. 3 is a flow diagram illustrating aspects of a method for determining a pressure applied by a user to a surface, according to another illustrative embodiment.

Turning now to FIG. 3, aspects of a method 300 for determining a pressure applied by the user 102 to the surface 104 will be described in detail, according to an illustrative embodiment. The method 300 will be described with reference to FIG. 3 and further reference to FIG. 1. The method 300 begins at operation 302, where the user device 108 generates the measurement signal 114 and sends the measurement signal 114 to the user's 102 body. The measurement signal 114 propagates through the user's 102 body into the surface 104.

From operation 302, the method 300 proceeds to operation 304, where the user device 108 receives the modified measurement signal 116 from the surface 104. From operation 304, the method 300 proceeds to operation 306, where the user device 108 compares the modified measurement signal 116 to the baseline signal (i.e., the modified reference signal 110) stored in the baseline signal storage component 112 to determine a change between one or more signal characteristics between the modified measurement signal 116 and the baseline signal.

As the user 102 applies pressure to the surface 104, the user's 102 skin between the surface 104 and the user's 102 bone is compressed. The compression of the user's 102 skin results in at least two changes. The first change is the reduction of the distance between the user device 108 and the surface 104. The reduction of the distance between the user device 108 and the surface 104 results in a shorter period of time for the measurement signal 114 to propagate through the user's 102 body, into the surface 104, and back to the user device 108 as the modified measurement signal 116 in comparison to the reference signal 106. The second change is the change in skin and soft tissue involvement in conducting the measurement signal 114 from the user's 102 bone to the surface 104. Compressed skin and soft tissue is more rigid and has a noticeable effect on a signal propagating through the user's 102 body. By considering at least the two aforementioned changes, the user device 104 can determine different levels of applied pressure during bone conduction signal exchanges.

From operation 306, the method 300 proceeds to operation 308, where the user device 108 determines a pressure that the user 102 has applied to the surface 104 based upon the change between one or more signal characteristics between the modified signal 116 and the baseline signal. The pressure can be referenced in any unit of pressure, some examples of which include pounds per square inch ("PSI"), pascals, newton per square meter ("N/m$^2$"), or bars.

From operation 308, the method 300 proceeds to operation 310. The method 300 ends at operation 310.

Figure 4:
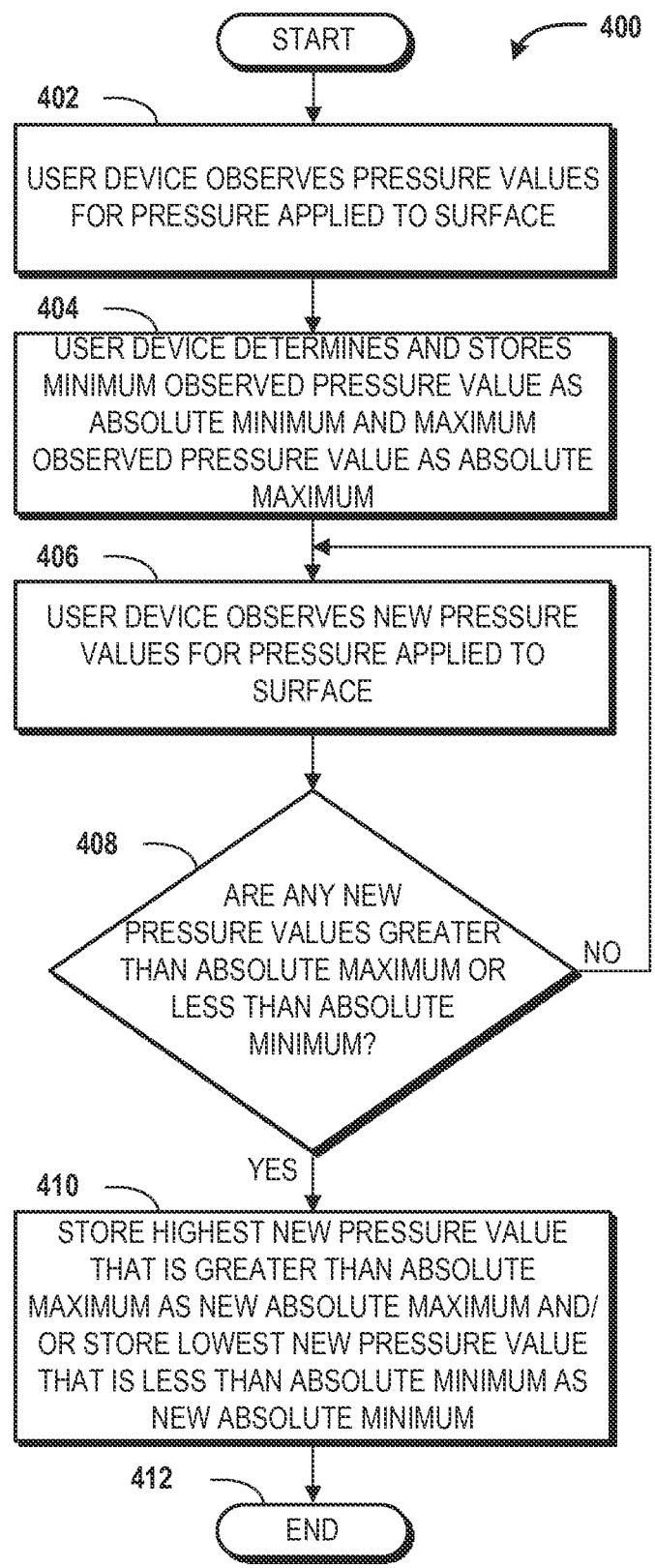
FIG. 4 is a flow diagram illustrating aspects of another method for determining a pressure applied by a user to a surface, according to another illustrative embodiment.

Turning now to FIG. 4, aspects of a method 400 for determining a pressure applied by the user 102 to the surface 104 will be described in detail, according to an illustrative embodiment. The method 400 will be described with reference to FIG. 4 and further reference to FIG. 1. The method 400 begins at operation 402, where the user device 108 observes pressure values for pressures applied to the surface 104. The user device 108 can observe the pressure values over time based upon multiple measurement signals, such as the measurement signal 114, sent to the user' 102 body and through the surface 104.

From operation 402, the method 400 proceeds to operation 404, where the user device 108 determines a minimum observed pressure value of the pressure values observed at operation 402 and stores the minimum observed pressure value as an absolute minimum pressure that has been applied to the surface 104 by the user 102. The user device 108, at operation 404, also determines a maximum observed pressure value of the pressure values observed at operation 402 and stores the maximum observed pressure value as an absolute maximum pressure that has been applied to the surface 104 by the user 102.

From operation 404, the method 400 proceeds to operation 406, where the user device 108 observes new pressure values for pressures applied to the surface 104. From operation 406, the method 400 proceeds to operation 408, where the user device 108 determines if any of the new pressure values is greater than the absolute maximum pressure or less than the absolute minimum pressure. If, at operation 408, the user device 108 determines that a pressure value is greater than the absolute maximum pressure or less than the absolute minimum pressure, the method 400 proceeds to operation 410, where the user device 108 stores the highest new pressure value that is greater than the absolute maximum pressure as a new absolute maximum pressure and/or stores the lowest new pressure value that is less than the absolute minimum pressure as a new absolute minimum pressure. The method 400 then proceeds to operation 412, where the method 400 ends. If, back at operation 408, the user device 108 determines that no pressure value is greater than the absolute maximum pressure or less than the absolute minimum pressure, the method 400 proceeds back to operation 406, where the user device 108 may observe new pressure values for pressures applied to the surface 104.

Figure 5:
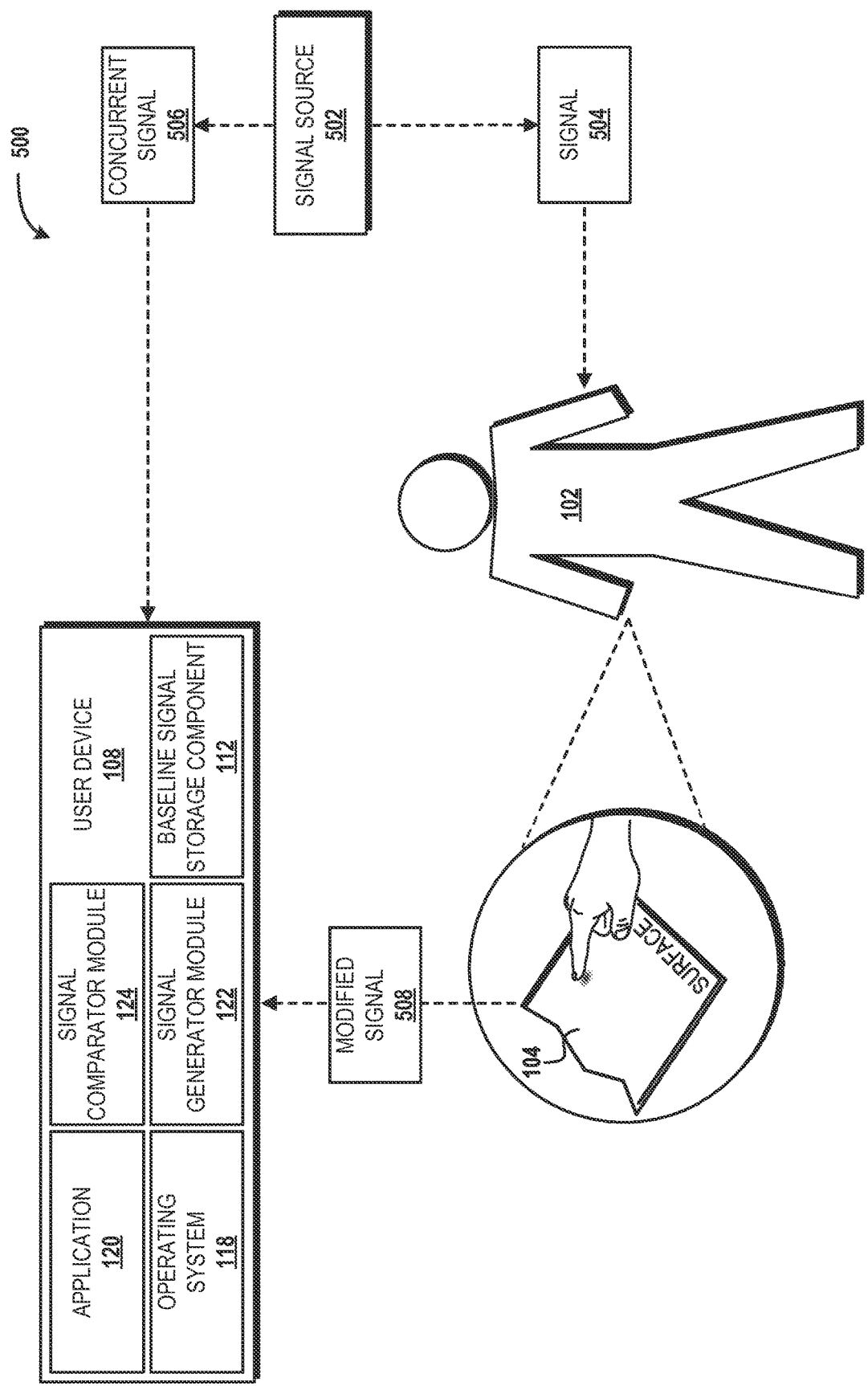
FIG. 5 is a block diagram illustrating aspects of an illustrative operating environment for various concepts disclosed herein, according to another illustrative embodiment.

Turning now to FIG. 5, a block diagram illustrating aspects of another operating environment 500 will be described, according to an illustrative embodiment. The operating environment 500 shown in FIG. 5 includes the user 102 in contact with the surface 104, and the user device 108 as illustrated and described above with reference to FIG. 1. In addition, the operating environment 500 includes a signal source 502. The signal source 502 can be any computing device that is capable of generating a signal and sending the signal to the user's 102 body. The signal source 502 may be a smartphone, feature phone, PDA, tablet device, laptop computer, desktop computer, server computer, video game system, handheld video game system, media player, set-top box, vehicle computing system, smart watch, personal tracker or safety device, other computing device, a combination thereof, or the like. It should be understood that the functionality of the signal source 502 can be provided by a single device, by two or more similar devices, and/or by two or more dissimilar devices.

The signal source 502 can generate a signal 504 and a concurrent signal 506. The signal source 502 can generate the signal 504 and the concurrent signal 506 with the same signal characteristics. The signal source 502 can send the signal 504 to the user's 102 body. The signal 504 propagates through the user's 102 body and into the surface 104. The signal 504 as modified by the user's 102 body and the surface 104 ("modified signal 508") is captured by the user device 108. The signal source 502 can send the concurrent signal 506 to the user device 108. The user device 108 can receive the concurrent signal 506 and save the concurrent signal 506 in the baseline signal storage component 112 as a baseline signal.

The user device 108 can execute the signal comparator module 124 to compare the baseline signal (i.e., the concurrent signal 506 saved in the baseline signal storage component 112) to the modified signal 508 received from the surface 104. The difference between one or more characteristics (e.g., frequency, amplitude, and/or phase) of the baseline signal and the modified signal 508 can be associated with a pressure applied by the user 102 to the surface 104. The pressure applied by the user 102 to the surface 104 can be used by the user device 108 for various applications, including, for example: wear and tear detection of the surface 104 or a portion thereof; input to an application executing on the user device 108 or a remote device (not shown); control of one or more systems, such as, but not limited to, a robotic system used in surgical or other medical applications; context detection; and slip detection. The aforementioned applications will be described in greater detail below.

FIG. 5 illustrates one user 102, one surface 104, one signal source 502, one signal 504, one user device 108, one concurrent signal 506, one modified signal 508, one baseline signal storage component 112, one operating system 118, one application 120, one signal generator module 122, and one signal comparator module 124. It should be understood, however, that various implementations of the operating environment 500 can include multiple users 102, multiple surfaces 104, multiple signal sources 502, multiple signals 504, multiple user devices 108, multiple concurrent signals 506, multiple modified signals 508, multiple baseline signal storage components 112, multiple operating systems 118, multiple applications 120, multiple signal generator modules 122, and/or multiple signal comparator modules 124. As such, the illustrated embodiment should be understood as being illustrative, and should not be construed as being limiting in any way.

Figure 6:
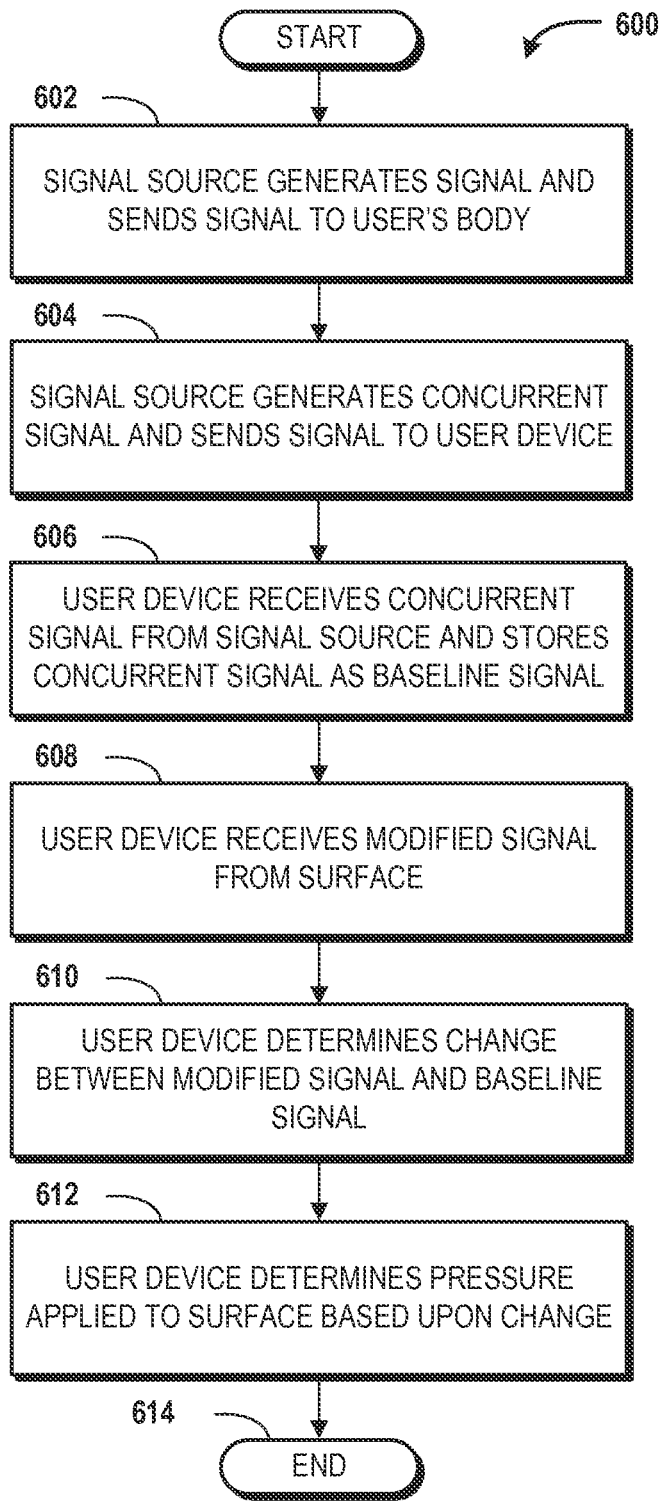
FIG. 6 is a flow diagram illustrating aspects of another method for determining a pressure applied by a user to a surface, according to another illustrative embodiment.

Turning now to FIG. 6, aspects of a method 600 for determining a pressure applied by the user 102 to the surface 104 will be described in detail, according to an illustrative embodiment. The method 600 will be described with reference to FIG. 6 and further reference to FIG. 5. The method 600 begins at operation 602, where the signal source 502 generates the signal 504 and sends the signal 504 to the user's 102 body. The signal 504 propagates through the user's 102 body into the surface 104. From operation 602, the method 600 proceeds to operation 604, where the signal source 502 generates the concurrent signal 506 and sends the concurrent signal 506 to the user device 108.

From operation 604, the method 600 proceeds to operation 606, where the user device 108 receives the concurrent signal 506 from the signal source 502 and stores the concurrent signal 506 in the baseline signal storage component 112 as a baseline signal. From operation 606, the method 600 proceeds to operation 608, where the user device 108 receives the modified signal 508 from the surface 104.

From operation 608, the method 600 proceeds to operation 610, where the user device 108 determines one or more changes between the modified signal 508 and the baseline signal (i.e., the concurrent signal 506) stored in the baseline signal storage component 112 to determine a change between one or more signal characteristics between the modified signal 508 and the baseline signal. From operation 610, the method 600 proceeds to operation 612, where the user device 108 determines a pressure that the user 102 has applied to the surface 104 based upon the change between one or more signal characteristics between the modified signal 508 and the baseline signal.

From operation 612, the method 600 proceeds to operation 614. The method 600 ends at operation 614.

Figure 7:
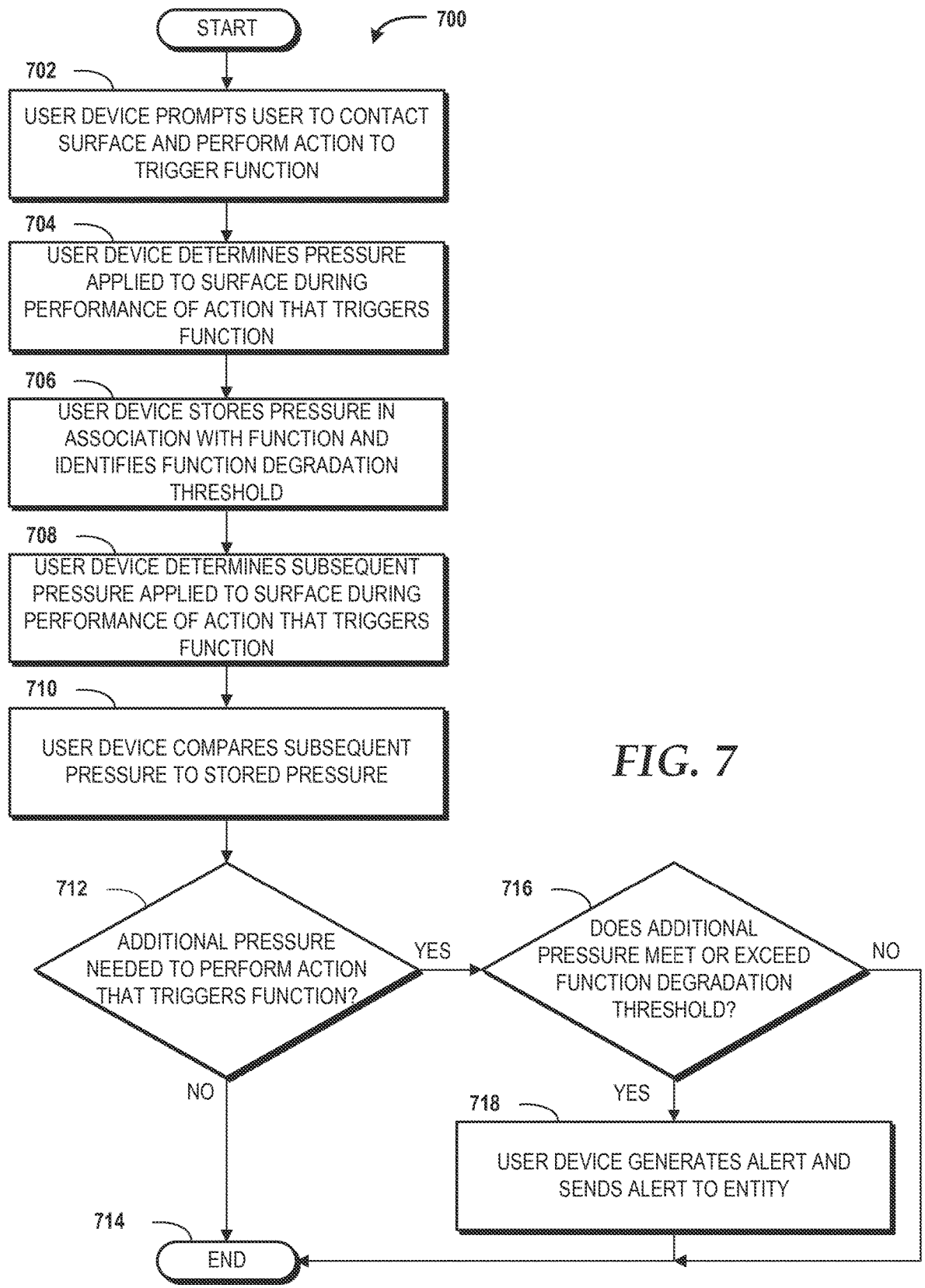
FIG. 7 is a flow diagram illustrating aspects of a method for determining wear and tear of a surface, according to an illustrative embodiment.

Turning now to FIG. 7, aspects of a method 700 for determining wear and tear of the surface 104 will be described in detail, according to an illustrative embodiment. The method 700 will be described with reference to FIG. 7 and further reference to FIGS. 1 and 5. The method 700 begins at operation 702, where the user device 108 prompts the user 102 to contact the surface 104 and perform an action to trigger a function. As described above, the surface 104 can be a button or other component of the user device 108. When pressed, a physical button may, for example, cause the user device 108 to perform a function, such as power on, power off, or wake from sleep or low-power state. Over time and after repeated use the button may become worn so that additional pressure is needed to perform the function. It is with respect to this example that the remainder of the method 700 is described.

From operation 702, the method 700 proceeds to operation 704, where the user device 108 determines a pressure applied to the surface 104 during the user's 102 performance of the action that triggers the function. The user device 108 can determine a pressure applied to the surface 104 via the method 300 described above with reference to FIG. 3, the method 400 described above with reference to FIG. 4, and/or the method 600 described above with reference to FIG. 6.

From operation 704, the method 700 proceeds to operation 706, where the user device 108 stores the pressure determined at operation 704 in association with the function triggered in response to the user's 102 performance of the action. Also at operation 706, the user device 108 identifies a function degradation threshold for the function. The function degradation threshold, in some embodiments, is predefined by a manufacturer of the surface 104, the user 102, or another entity. Extending the above example of the surface 104 being a button of the user device 108, a manufacturer of the user device 108 may define a pressure at which the button no longer triggers the function or a pressure at which the button inconsistently triggers the function.

From operation 706, the method 700 proceeds to operation 708, where the user device 108 determines a subsequent pressure applied to the surface 104 during performance of the action that triggers the function. The user device 108 can determine a subsequent pressure applied to the surface 104 via the method 300 described above with reference to FIG. 3, the method 400 described above with reference to FIG. 4, and/or the method 600 described above with reference to FIG. 6.

From operation 708, the method 700 proceeds to operation 710, where the user device 108 compares the subsequent pressure to the stored pressure. From operation 710, the method 700 proceeds to operation 712, where the user device 108 determines whether additional pressure is needed to perform the action that triggers the function based upon the comparison of the subsequent pressure to the stored pressure. If no additional pressure is needed to perform the action that triggers the function, the method 700 proceeds to operation 714, where the method 700 ends. If, however, the additional pressure is needed to perform the action that triggers the function, the method 700 proceeds to operation 716.

At operation 716, the user device 108 determines whether the additional pressure meets or exceeds the function degradation threshold identified at operation 706. If the user device 108 determines that the additional pressure does not meet or exceed the function degradation threshold identified at operation 706, the method 700 proceeds to operation 714, where the method 700 ends. If, however, the user device 108 determines that the additional pressure meets or exceeds the function degradation threshold, the method 700 proceeds to operation 718, where the user device 108 generates an alert and sends the alert to an entity. From operation 718, the method 700 proceeds to operation 714, where the method 700 ends.

Again borrowing the above example of the surface 104 being a button of the user device 108 and the function degradation threshold being defined by a manufacturer of the user device 108, the alert can be sent by the user device 108 to the manufacturer or other entity operating in support of the manufacturer to inform the manufacturer that the button has reached the function degradation threshold. The manufacturer in response to receiving the alert may contact the user 102 to arrange for replacement of the button. The alert can also be used by the manufacturer to monitor the button and/or other components of the user device 108 over time and in response make changes to the design, materials, and/or manufacturing processes used to create the user device 108 to increase or decrease durability of the user device 108.

Figure 8:
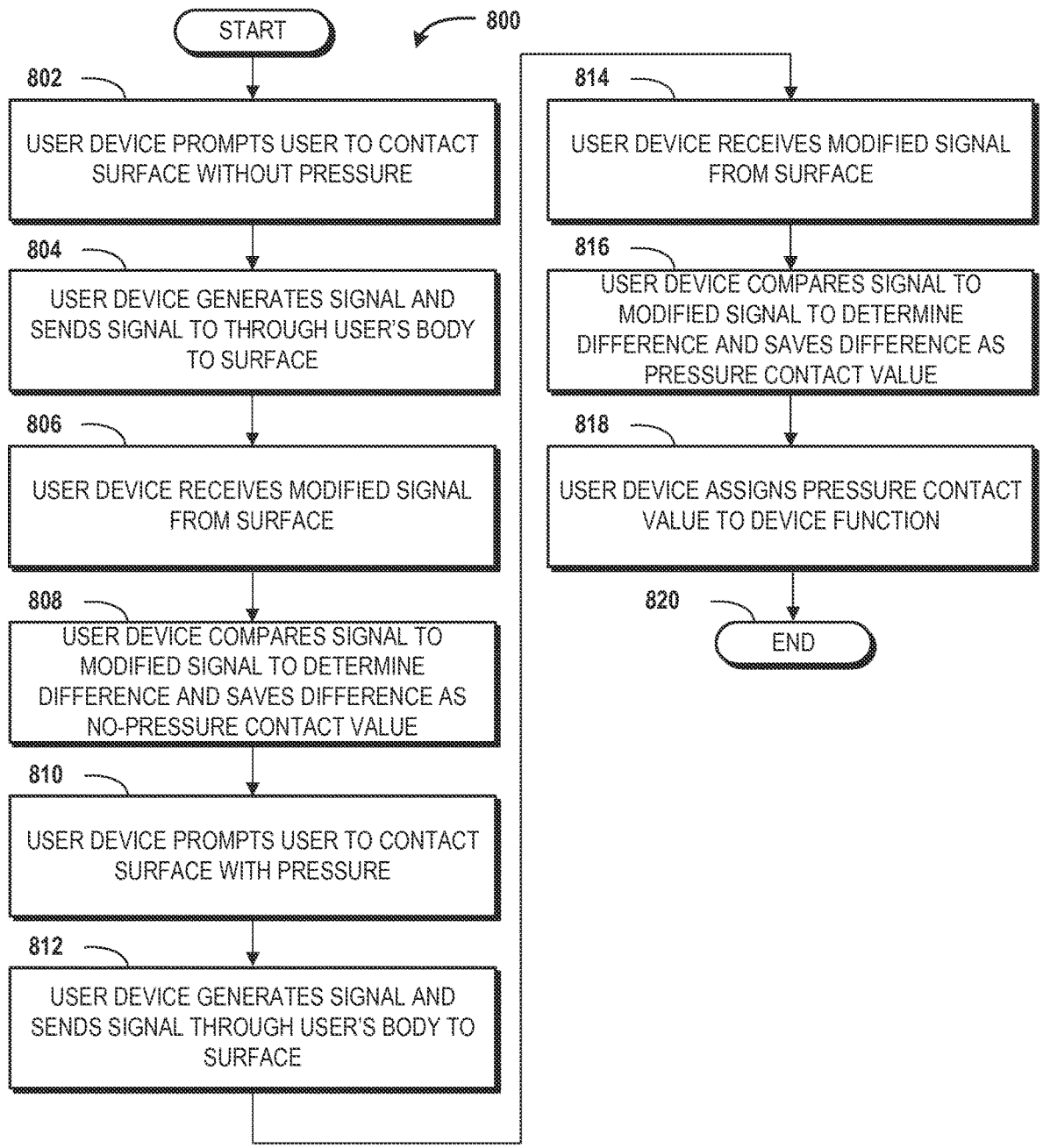
FIG. 8 is a flow diagram illustrating aspects of a method for setting up a pressure-based user experience ("UX"), according to an illustrative embodiment.

Turning now to FIG. 8, aspects of a method 800 for setting up a pressure-based user experience ("UX") will be described in detail, according to an illustrative embodiment. The method 800 will be described with reference to FIG. 8 and further reference to FIGS. 1 and 5. The method 800 begins at operation 802, where the user device 108 prompts the user 102 to contact the surface 104 without applying pressure. The user device 108 may prompt the user 102 to contact the surface 104 without applying pressure via a visual prompt on a display of the user device 108, via an audio prompt through a speaker of the user device 108, or a combination thereof. From operation 802, the method 800 proceeds to operation 804, where the user device 108 generates a signal and sends the signal through the user's 102 body to the surface 104. From operation 804, the method 800 proceeds to operation 806, where the user device 108 receives a modified signal from the surface 104. From operation 806, the method 800 proceeds to operation 808, where the user device 108 compares the signal to the modified signal to determine a difference in one or more characteristics of the signal and the modified signal. Also at operation 808, the user device 108 saves the difference between the signal and the modified signal as a no-pressure contact value indicative of when the user 102 is in contact with the surface 104 but is not applying pressure to the surface 104.

From operation 808, the method 800 proceeds to operation 810, where the user device 108 prompts the user 102 to contact the surface 104 with pressure. From operation 810, the method 800 proceeds to operation 812, where the user device 108 generates a signal and sends the signal through the user's 102 body to the surface 104. From operation 812, the method 800 proceeds to operation 814, where the user device 108 receives a modified signal from the surface 104. From operation 814, the method 800 proceeds to operation 816, where the user device 108 compares the signal to the modified signal to determine a difference in one or more characteristics of the signal and the modified signal. Also at operation 816, the user device 108 saves the difference between the signal and the modified signal as a pressure contact value indicative of when the user 102 is in contact with the surface 104 and is applying pressure to the surface 104.

From operation 816, the method 800 proceeds to operation 818, where the user device 108 assigns the pressure contact value saved at operation 816 to a function of the user device 108. When the user 102 applies pressure to the surface 104 that is equal to the pressure contact value, the user device 108 may perform the corresponding function. In this manner, a pressure can be applied by the user 102 to one or more surfaces of the user device 108, such as a display or at least a portion of a housing, to cause the user device 108 to perform one or more functions. The use of pressure as an input mechanism can be used to control applications, such as the application 120, executing on the user device 102. Moreover, devices that do not offer functionality such as a touchscreen may now be able to provide similar functionality by sensing pressure via bone conduction as described herein.

From operation 818, the method 800 proceeds to operation 820. The method 800 ends at operation 820.

Figure 9:
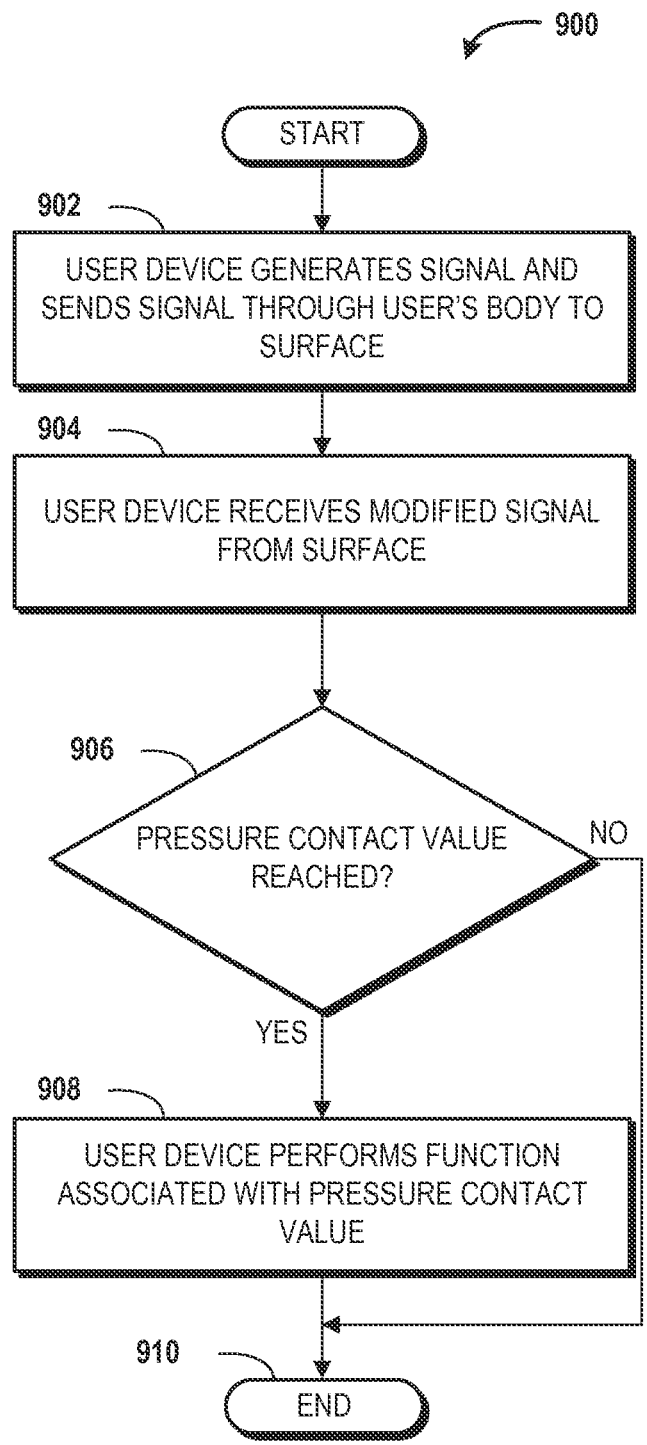
FIG. 9 is a flow diagram illustrating aspects of a method for providing a pressure-based UX, according to an illustrative embodiment.

Turning now to FIG. 9, aspects of a method 900 for providing a pressure-based UX will be described in detail, according to an illustrative embodiment. The method 900 will be described with reference to FIG. 9 and further reference to FIGS. 1 and 5. The method 900 begins at operation 902, where the user device 108 generates a signal and sends the signal through the user's 102 body to the surface 104. From operation 902, the method 900 proceeds to operation 904, where the user device 108 receives a modified signal from the surface 104.

From operation 904, the method 900 proceeds to operation 906, where the user device 108 determines whether the pressure contact value saved at operation 816 of the method 800 described above with reference to FIG. 8 has been reached. If the user device 108 determines that the pressure contact value has been reached, the method 900 proceeds to operation 908, where the user device 108 performs the function associated with the pressure contact value. The method 900 then proceeds to operation 910, where the method 900 ends. If, back at operation 906, the user device 108 determines that the pressure contact value has not been reached, the method 900 ends at operation 910.

Figure 10:
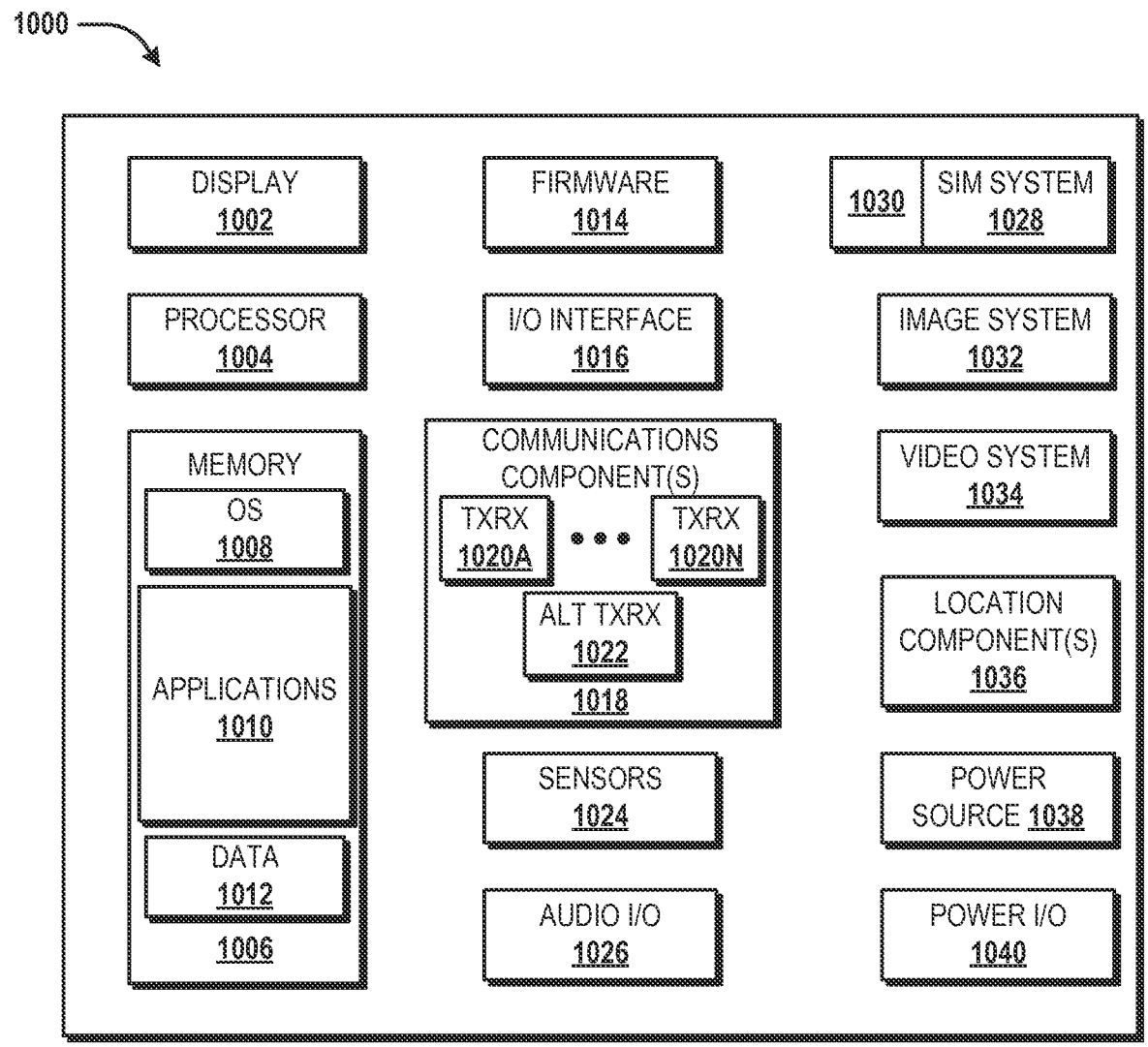
FIG. 10 is a block diagram illustrating an example mobile device capable of implementing aspects of the embodiments disclosed herein.

Turning now to FIG. 10, an illustrative mobile device 1000 and components thereof will be described. In some embodiments, the user device 108, the signal source 502, and/or the surface 104 described above can be configured as and/or can have an architecture similar or identical to the mobile device 1000 described herein in FIG. 10. It should be understood, however, that the user device 108 may or may not include the functionality described herein with reference to FIG. 10. While connections are not shown between the various components illustrated in FIG. 10, it should be understood that some, none, or all of the components illustrated in FIG. 10 can be configured to interact with one other to carry out various device functions. In some embodiments, the components are arranged so as to communicate via one or more busses (not shown). Thus, it should be understood that FIG. 10 and the following description are intended to provide a general understanding of a suitable environment in which various aspects of embodiments can be implemented, and should not be construed as being limiting in any way.

As illustrated in FIG. 10, the mobile device 1000 can include a display 1002 for displaying data. According to various embodiments, the display 1002 can be configured to display various graphical user interface ("GUI") elements, text, images, video, advertisements, various prompts, virtual keypads and/or keyboards, messaging data, notification messages, metadata, internet content, device status, time, date, calendar data, device preferences, map and location data, combinations thereof, and the like. The mobile device 1000 also can include a processor 1004 and a memory or other data storage device ("memory") 1006. The processor 1004 can be configured to process data and/or can execute computer-executable instructions stored in the memory 1006. The computer-executable instructions executed by the processor 1004 can include, for example, an operating system 1008 (e.g., the operating system 118), one or more applications 1010 (e.g., the application 120), other computer-executable instructions stored in a memory 1006, or the like. In some embodiments, the applications 1010 also can include a UI application (not illustrated in FIG. 10).

The UI application can interface with the operating system 1008 to facilitate user interaction with functionality and/or data stored at the mobile device 1000 and/or stored elsewhere. In some embodiments, the operating system 1008 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the MS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1004 to aid a user in entering content, viewing account information, answering/initiating calls, entering/deleting data, entering and setting user IDs and passwords for device access, configuring settings, manipulating address book content and/or settings, multimode interaction, interacting with other applications 1010, and otherwise facilitating user interaction with the operating system 1008, the applications 1010, and/or other types or instances of data 1012 that can be stored at the mobile device 1000. The data 1012 can include user preferences, user settings, the baseline signal storage component, and/or other data. The applications 1010 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1010, the data 1012, and/or portions thereof can be stored in the memory 1006 and/or in a firmware 1014, and can be executed by the processor 1004. The firmware 1014 also can store code for execution during device power up and power down operations. It can be appreciated that the firmware 1014 can be stored in a volatile or non-volatile data storage device including, but not limited to, the memory 1006 and/or a portion thereof.

The mobile device 1000 also can include an input/output ("I/O") interface 1016. The I/O interfaced 1016 can be configured to support the input/output of data such as location information, user information, organization information, presence status information, user IDs, passwords, and application initiation (start-up) requests. In some embodiments, the I/O interface 1016 can include a hardwire connection such as USB port, a mini-USB port, a micro-USB port, an audio jack, a PS2 port, an IEEE 13104 ("FIREWIRE") port, a serial port, a parallel port, an Ethernet (RJ411) port, an RJ11 port, a proprietary port, combinations thereof, or the like. In some embodiments, the mobile device 1000 can be configured to synchronize with another device to transfer content to and/or from the mobile device 1000. In some embodiments, the mobile device 1000 can be configured to receive updates to one or more of the applications 1010 via the I/O interface 1016, though this is not necessarily the case. In some embodiments, the I/O interface 1016 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1016 may be used for communications between the mobile device 1000 and a network device or local device.

The mobile device 1000 also can include a communications component 1018. The communications component 1018 can be configured to interface with the processor 1004 to facilitate wired and/or wireless communications with one or more networks. In some embodiments, other networks include networks that utilize non-cellular wireless technologies such as WI-FI or WIMAX. In some embodiments, the communications component 1018 includes a multimode communications subsystem for facilitating communications via the cellular network and one or more other networks.

The communications component 1018, in some embodiments, includes one or more transceivers. The one or more transceivers, if included, can be configured to communicate over the same and/or different wireless technology standards with respect to one another. For example, in some embodiments one or more of the transceivers of the communications component 1018 may be configured to communicate using Global System for Mobile communication ("GSM"), Code Division Multiple Access ("CDMA"), CDMAONE, CDMA2000, Long-Term Evolution ("LTE"), and various other 2G, 2.5G, 3G, 4G, and greater generation technology standards. Moreover, the communications component 1018 may facilitate communications over various channel access methods (which may or may not be used by the aforementioned standards) including, but not limited to, Time Division Multiple Access ("TDMA"), Frequency Division Multiple Access ("FDMA"), Wideband CDMA ("W-CDMA"), Orthogonal Frequency-Division multiplexing ("OFDM"), Space-Division Multiple Access ("SDMA"), and the like.

In addition, the communications component 1018 may facilitate data communications using Generic Packet Radio Service ("GPRS"), Enhanced Date Rates for GSM Evolution ("EDGE"), the High-Speed Packet Access ("HSPA") protocol family, including High-Speed Downlink Packet Access ("HSDPA"), Enhanced Uplink ("EUL") or otherwise termed Highs-Speed Uplink Packet Access ("HSUPA"), HSPA+, and various other current and future wireless data access standards. In the illustrated embodiment, the communications component 1018 can include a first transceiver ("TxRx") 1020A that can operate in a first communications mode (e.g., GSM). The communications component 1018 also can include an $N^{th}$ transceiver ("TxRx") 1020N that can operate in a second communications mode relative to the first transceiver 1020A (e.g., UMTS). While two transceivers 1020A-N (hereinafter collectively and/or generically referred to as "transceivers 1020") are shown in FIG. 10, it should be appreciated that less than two, two, and/or more than two transceivers 1020 can be included in the communications component 1018.

The communications component 1018 also can include an alternative transceiver ("Alt TxRx") 1022 for supporting other types and/or standards of communications. According to various contemplated embodiments, the alternative transceiver 1022 can communicate using various communications technologies such as, for example, WI-FI, WIMAX, BLUETOOTH, infrared, IRDA, NFC, other RF technologies, combinations thereof, and the like.

In some embodiments, the communications component 1018 also can facilitate reception from terrestrial radio networks, digital satellite radio networks, internet-based radio service networks, combinations thereof, and the like. The communications component 1018 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1000 also can include one or more sensors 1024. The sensors 1024 can include temperature sensors, light sensors, air quality sensors, movement sensors, orientation sensors, noise sensors, proximity sensors, or the like. As such, it should be understood that the sensors 1024 can include, but are not limited to, accelerometers, magnetometers, gyroscopes, infrared sensors, noise sensors, microphones, combinations thereof, or the like. Additionally, audio capabilities for the mobile device 1000 may be provided by an audio I/O component 1026. The audio I/O component 1026 of the mobile device 1000 can include one or more speakers for the output of audio signals, one or more microphones for the collection and/or input of audio signals, and/or other audio input and/or output devices.

The illustrated mobile device 1000 also can include a subscriber identity module ("SIM") system 1028. The SIM system 1028 can include a universal SIM ("USIM"), a universal integrated circuit card ("UICC") and/or other identity devices. The SIM system 1028 can include and/or can be connected to or inserted into an interface such as a slot interface 1030. In some embodiments, the slot interface 1030 can be configured to accept insertion of other identity cards or modules for accessing various types of networks. Additionally, or alternatively, the slot interface 1030 can be configured to accept multiple subscriber identity cards. Because other devices and/or modules for identifying users and/or the mobile device 1000 are contemplated, it should be understood that these embodiments are illustrative, and should not be construed as being limiting in any way.

The mobile device 1000 also can include an image capture and processing system 1032 ("image system"). The image system 1032 can be configured to capture or otherwise obtain photos, videos, and/or other visual information. As such, the image system 1032 can include cameras, lenses, charge-coupled devices ("CCDs"), combinations thereof, or the like. The mobile device 1000 may also include a video system 1034. The video system 1034 can be configured to capture, process, record, modify, and/or store video content. Photos and videos obtained using the image system 1032 and the video system 1034, respectively, may be added as message content to an MMS message, email message, and sent to another mobile device. The video and/or photo content also can be shared with other devices via various types of data transfers via wired and/or wireless communication devices as described herein.

The mobile device 1000 also can include one or more location components 1036. The location components 1036 can be configured to send and/or receive signals to determine a geographic location of the mobile device 1000. According to various embodiments, the location components 1036 can send and/or receive signals from global positioning system ("GPS") devices, assisted-GPS ("A-GPS") devices, WI-FI/WIMAX and/or cellular network triangulation data, combinations thereof, and the like. The location component 1036 also can be configured to communicate with the communications component 1018 to retrieve triangulation data for determining a location of the mobile device 1000. In some embodiments, the location component 1036 can interface with cellular network nodes, telephone lines, satellites, location transmitters and/or beacons, wireless network transmitters and receivers, combinations thereof, and the like. In some embodiments, the location component 1036 can include and/or can communicate with one or more of the sensors 1024 such as a compass, an accelerometer, and/or a gyroscope to determine the orientation of the mobile device 1000. Using the location component 1036, the mobile device 1000 can generate and/or receive data to identify its geographic location, or to transmit data used by other devices to determine the location of the mobile device 1000. The location component 1036 may include multiple components for determining the location and/or orientation of the mobile device 1000.

The illustrated mobile device 1000 also can include a power source 1038. The power source 1038 can include one or more batteries, power supplies, power cells, and/or other power subsystems including alternating current ("AC") and/or direct current ("DC") power devices. The power source 1038 also can interface with an external power system or charging equipment via a power I/O component 1040. Because the mobile device 1000 can include additional and/or alternative components, the above embodiment should be understood as being illustrative of one possible operating environment for various embodiments of the concepts and technologies described herein. The described embodiment of the mobile device 1000 is illustrative, and should not be construed as being limiting in any way.

Figure 11:
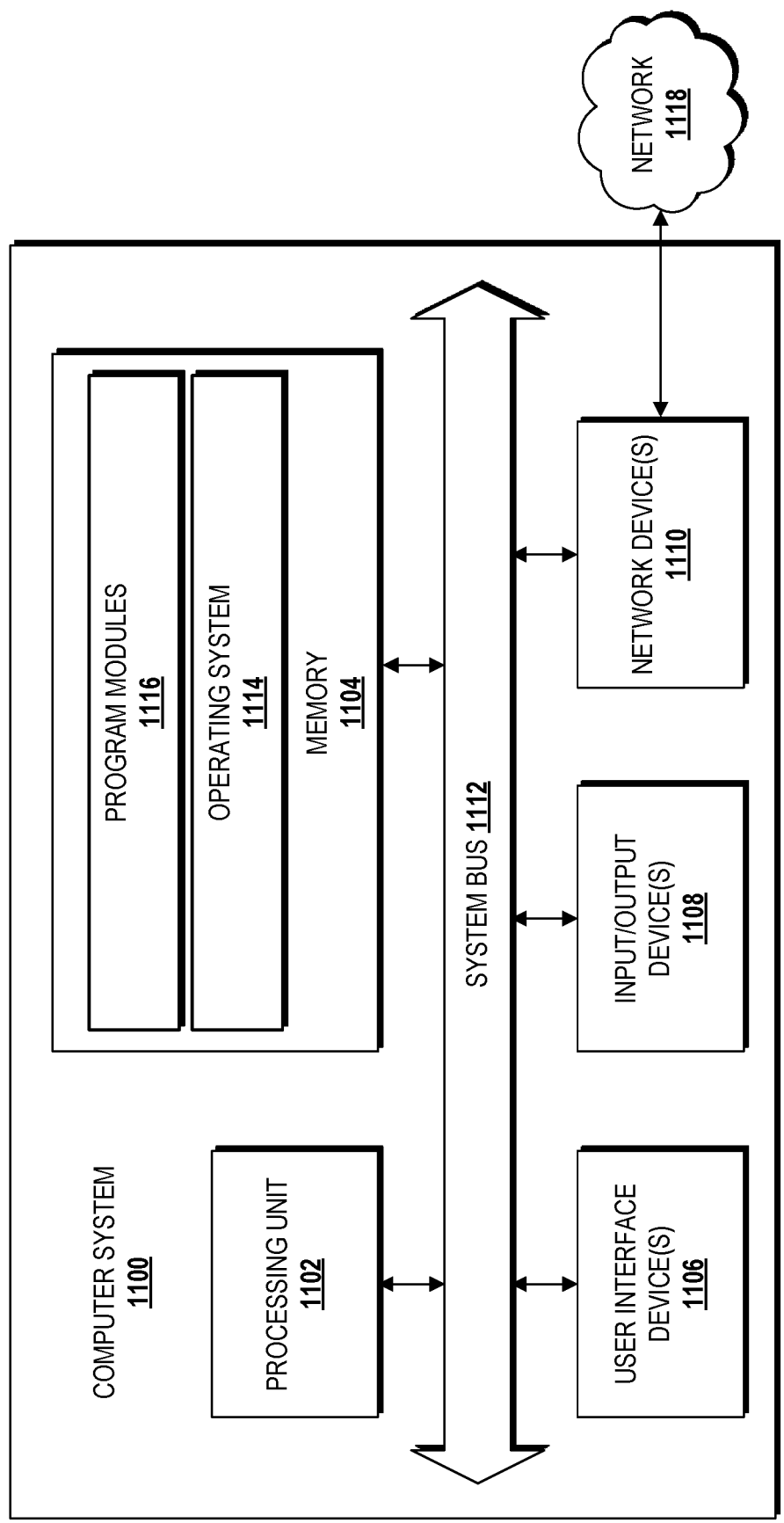
FIG. 11 is a block diagram illustrating an example computer system capable of implementing aspects of the embodiments presented herein.

FIG. 11 is a block diagram illustrating a computer system 1100 configured to provide the functionality in accordance with various embodiments of the concepts and technologies disclosed herein. In some implementations, the user device 108, the signal source 502, and/or the surface 104 are configured to utilize an architecture that is the same as or similar to the architecture of the computer system 1100. It should be understood, however, that modification to the architecture may be made to facilitate certain interactions among elements described herein.

The computer system 1100 includes a processing unit 1102, a memory 1104, one or more user interface devices 1106, one or more input/output ("I/O") devices 1108, and one or more network devices 1110, each of which is operatively connected to a system bus 1112. The bus 1112 enables bi-directional communication between the processing unit 1102, the memory 1104, the user interface devices 1106, the I/O devices 1108, and the network devices 1110.

The processing unit 1102 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 1104 communicates with the processing unit 1102 via the system bus 1112. In some embodiments, the memory 1104 is operatively connected to a memory controller (not shown) that enables communication with the processing unit 1102 via the system bus 1112. The memory 1104 includes an operating system 1114 (e.g., the operating system 118) and one or more program modules 1116. The operating system 1114 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 1116 may include various software and/or program modules to perform the various operations described herein. The program modules 1116 can include, for example, the signal comparator module 124, the signal generator module 122, and/or the application 120. The program modules 1116 and/or other programs can be embodied in computer-readable media containing instructions that, when executed by the processing unit 1102, perform one or more of the operations described herein. According to embodiments, the program modules 1116 may be embodied in hardware, software, firmware, or any combination thereof. Although not shown in FIG. 11, it should be understood that the memory 1104 can be or can include the baseline signal storage component 112. The memory 1104 can also store other data, if desired.

By way of example, and not limitation, computer-readable media may include any available computer storage media or communication media that can be accessed by the computer system 1100. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1100. In the claims, the phrase "computer storage medium" and variations thereof does not include waves or signals per se and/or communication media.

The user interface devices 1106 may include one or more devices with which a user accesses the computer system 1100. The user interface devices 1106 may include, but are not limited to, computers, servers, personal digital assistants, cellular phones, or any suitable computing devices. The I/O devices 1108 enable a user to interface with the program modules 1116. In one embodiment, the I/O devices 1108 are operatively connected to an I/O controller (not shown) that enables communication with the processing unit 1102 via the system bus 1112. The I/O devices 1108 may include one or more input devices, such as, but not limited to, a keyboard, a mouse, or an electronic stylus. Further, the I/O devices 1108 may include one or more output devices, such as, but not limited to, a display screen or a printer.

The network devices 1110 enable the computer system 1100 to communicate with other networks or remote systems via a network 1118. Examples of the network devices 1110 include, but are not limited to, a modem, a radio frequency ("RF") or infrared ("IR") transceiver, a telephonic interface, a bridge, a router, or a network card. The network 1118 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network.

Alternatively, the network 1118 may be a wired network such as, but not limited to, a Wide Area Network ("WAN"), a wired LAN such as provided via Ethernet, a wired Personal Area Network ("PAN"), or a wired Metropolitan Area Network ("MAN").

Figure 12:
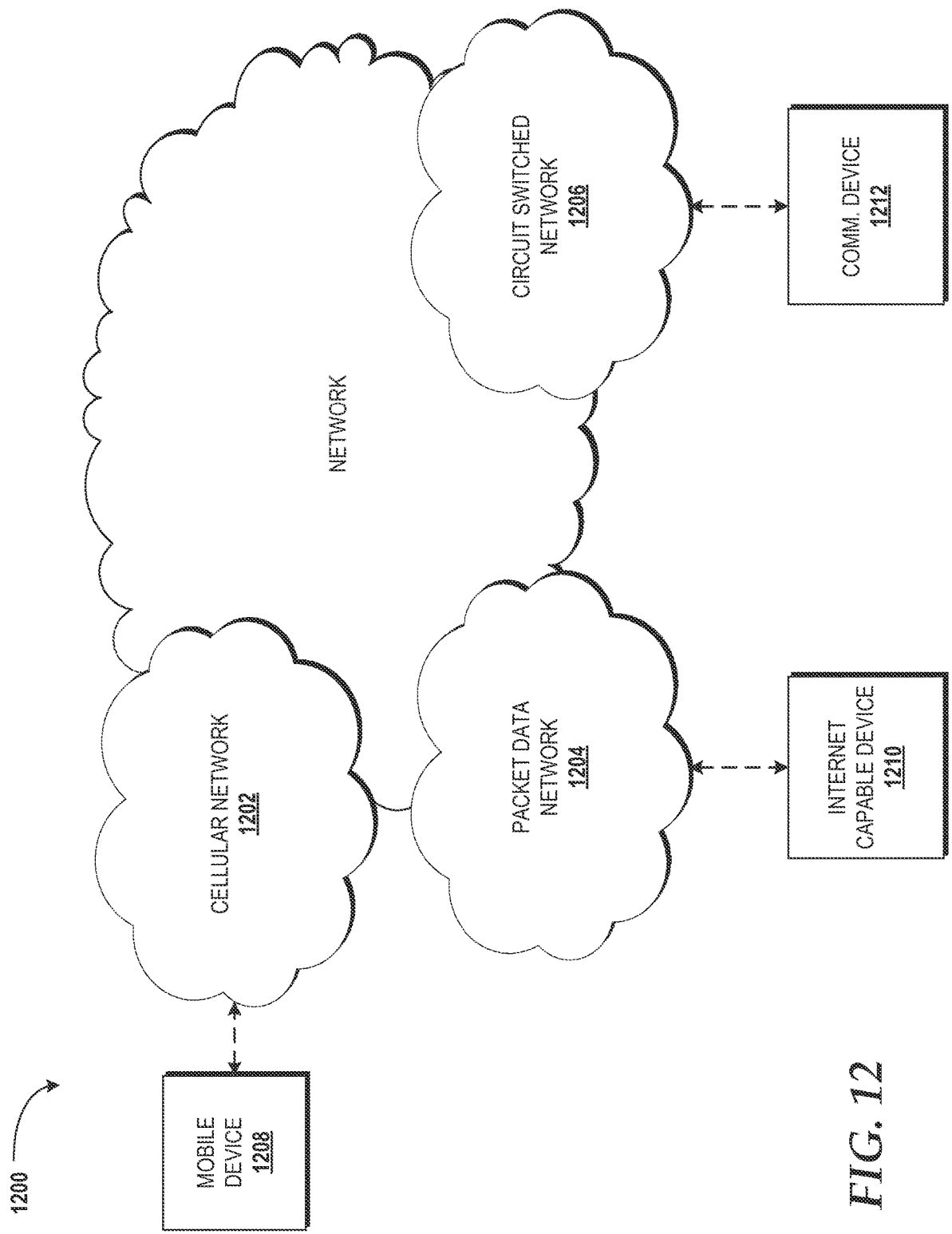
FIG. 12 schematically illustrates a network, according to an illustrative embodiment.

Turning now to FIG. 12, details of a network 1200 will be described, according to an illustrative embodiment. The network 1200 includes a cellular network 1202, a packet data network 1204, for example, the Internet, and a circuit switched network 1206, for example, a publicly switched telephone network ("PSTN"). The cellular network 1202 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1202 also includes radios and nodes for receiving and transmitting voice, data, and combinations thereof to and from radio transceivers, networks, the packet data network 1204, and the circuit switched network 1206.

A mobile communications device 1208, such as, for example, a cellular telephone, a user equipment, a mobile terminal, a PDA, a laptop computer, a handheld computer, the user device 108, and combinations thereof, can be operatively connected to the cellular network 1202. The cellular network 1202 can be configured as a 2G GSM network and can provide data communications via GPRS and/or EDGE. Additionally, or alternatively, the cellular network 1202 can be configured as a 3G UMTS network and can provide data communications via the HSPA protocol family, for example, HSDPA, EUL (also referred to as HSUPA), and HSPA+. The cellular network 1202 also is compatible with 4G mobile communications standards such as LTE, or the like, as well as evolved and future mobile standards.

The packet data network 1204 includes various devices, for example, servers, computers, databases, and other devices in communication with one another, as is generally known. The packet data network 1204 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1204 includes or is in communication with the Internet. The circuit switched network 1206 includes various hardware and software for providing circuit switched communications. The circuit switched network 1206 may include, or may be, what is often referred to as a plain old telephone system ("POTS"). The functionality of a circuit switched network 1206 or other circuit-switched network are generally known and will not be described herein in detail.

The illustrated cellular network 1202 is shown in communication with the packet data network 1204 and a circuit switched network 1206, though it should be appreciated that this is not necessarily the case. One or more Internet-capable devices 1210, for example, the user device 108, a PC, a laptop, a portable device, or another suitable device, can communicate with one or more cellular networks 1202, and devices connected thereto, through the packet data network 1204. It also should be appreciated that the Internet-capable device 1210 can communicate with the packet data network 1204 through the circuit switched network 1206, the cellular network 1202, and/or via other networks (not illustrated).

As illustrated, a communications device 1212, for example, a telephone, facsimile machine, modem, computer, the user device 108, or the like, can be in communication with the circuit switched network 1206, and therethrough to the packet data network 1204 and/or the cellular network 1202. It should be appreciated that the communications device 1212 can be an Internet-capable device, and can be substantially similar to the Internet-capable device 1210. In the specification, the network 502 is used to refer broadly to any combination of the networks 1202, 1204, 1206. It should be appreciated that substantially all of the functionality described with reference to the network 502 can be performed by the cellular network 1202, the packet data network 1204, and/or the circuit switched network 1206, alone or in combination with other networks, network elements, and the like.

Based on the foregoing, it should be appreciated that concepts and technologies directed to pressure sensing via bone conduction have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A method performed by a processor of a device executing instructions stored in a memory, the method comprising:

generating, by the device, a measurement bone conduction signal;

sending, by the device, the measurement bone conduction signal to a body of an individual, wherein the measurement bone conduction signal propagates through a bone of the body of the individual and into a surface;

receiving, by the device, a modified measurement bone conduction signal from the surface, wherein the modified measurement bone conduction signal comprises the measurement bone conduction signal that has propagated through and has been modified by the bone of the body of the individual and the surface, wherein the modified measurement bone conduction signal represents a pressure state in which the individual applies a pressure to the surface;

comparing, by the device, the modified measurement bone conduction signal to a baseline bone conduction signal, wherein the baseline bone conduction signal represents a no-pressure state in which the individual does not apply the pressure to the surface;

determining, by the device, based upon comparing the modified measurement bone conduction signal to the baseline bone conduction signal, a change between the modified measurement bone conduction signal and the baseline bone conduction signal; and determining, by the device, based upon the change between the modified measurement bone conduction signal and the baseline bone conduction signal, a pressure value for the pressure applied by the individual to the surface.

2. The method of claim 1, further comprising:
generating, by the device, a reference bone conduction signal;
sending, by the device, the reference bone conduction signal to the body of the individual, wherein the reference bone conduction signal propagates through the bone of the body of the individual and into the surface;
receiving, by the device, a modified reference bone conduction signal from the surface, wherein the modified reference bone conduction signal comprises the reference bone conduction signal after the reference bone conduction signal has propagated through and has been modified by the bone of the body of the individual and the surface; and
saving, by the device, the modified reference bone conduction signal as the baseline bone conduction signal.

3. The method of claim 1, further comprising:
observing, by the device, a plurality of pressure values for a plurality of pressures applied by the individual to the surface;
determining, by the device, from the plurality of pressure values, a minimum observed pressure value and a maximum observed pressure value; and
storing, by the device, the minimum observed pressure value and the maximum observed pressure value in association with the surface and the individual.

4. The method of claim 1, further comprising:
prompting, by the device, to perform an action to trigger a function;
storing, by the device, the pressure value associated with the pressure applied by the individual to the surface in association with the function;
identifying, by the device, a function degradation threshold for the function, the function degradation threshold comprising a threshold pressure;
determining, by the device, a subsequent pressure value associated with a subsequent pressure applied by the individual to the surface;
determining, by the device, that the subsequent pressure value associated with the subsequent pressure applied by the individual to the surface meets the function degradation threshold; and
generating, by the device, an alert directed to an entity to inform the entity that the function degradation threshold has been met.

5. The method of claim 4, wherein the surface is a component of the device.

6. A device comprising:
a processor; and
a memory that stores instructions that, when executed by the processor, cause the processor to perform operations comprising:
generating a measurement bone conduction signal,
sending the measurement bone conduction signal to a body of an individual, wherein the measurement bone conduction signal propagates through a bone of the body of the individual and into a surface,
receiving a modified measurement bone conduction signal from the surface, wherein the modified measurement bone conduction signal comprises the measurement bone conduction signal that has propagated through and has been modified by the bone of the body of the individual and the surface, wherein the modified measurement bone conduction signal represents a pressure state in which the individual applies a pressure to the surface,
comparing the modified measurement bone conduction signal to a baseline bone conduction signal, wherein the baseline bone conduction signal represents a no-pressure state in which the individual does not apply the pressure to the surface,
determining, based upon comparing the modified measurement bone conduction signal to the baseline bone conduction signal, a change between the modified measurement bone conduction signal and the baseline bone conduction signal, and
determining, based upon the change between the modified measurement bone conduction signal and the baseline bone conduction signal, a pressure value for the pressure applied by the individual to the surface.

7. The device of claim 6, wherein the operations further comprise:
generating a reference bone conduction signal;
sending the reference bone conduction signal to the body of the individual, wherein the reference bone conduction signal propagates through the bone of the body of the individual and into the surface;
receiving a modified reference bone conduction signal from the surface, wherein the modified reference bone conduction signal comprises the reference bone conduction signal after the reference bone conduction signal has propagated through and has been modified by the bone of the body of the individual and the surface; and
saving the modified reference bone conduction signal as the baseline bone conduction signal.

8. The device of claim 6, wherein the operations further comprise:
observing a plurality of pressure values for a plurality of pressures applied by the individual to the surface;
determining, from the plurality of pressure values, a minimum observed pressure value and a maximum observed pressure value; and
storing the minimum observed pressure value and the maximum observed pressure value in association with the surface and the individual.

9. The device of claim 6, wherein the surface is a component of the device, and wherein the operations further comprise:
prompting the individual to contact the surface and to perform an action to trigger a function of the surface;
storing the pressure value associated with the pressure applied by the individual to the surface in association with the function;
identifying a function degradation threshold for the function, the function degradation threshold comprising a threshold pressure;
determining a subsequent pressure value associated with a subsequent pressure applied by the individual to the surface;
determining that the subsequent pressure value associated with the subsequent pressure applied by the individual to the surface meets the function degradation threshold; and generating an alert directed to an entity to inform the entity that the function degradation threshold has been met.

10. A computer-readable storage medium having instructions stored thereon that, when executed by a processor of a device, cause the processor to perform operations comprising:
   generating a measurement bone conduction signal;
   sending the measurement bone conduction signal to a body of an individual, wherein the measurement bone conduction signal propagates through a bone of the body of the individual and into a surface;
   receiving a modified measurement bone conduction signal from the surface, wherein the modified measurement bone conduction signal comprises the measurement bone conduction signal that has propagated through and has been modified by the bone of the body of the individual and the surface, wherein the modified measurement bone conduction signal represents a pressure state in which the individual applies a pressure to the surface;
   comparing the modified measurement bone conduction signal to a baseline bone conduction signal, wherein the baseline bone conduction signal represents a no-pressure state in which the individual does not apply the pressure to the surface;
   determining, based upon comparing the modified measurement bone conduction signal to the baseline bone conduction signal, a change between the modified measurement bone conduction signal and the baseline bone conduction signal; and
   determining, based upon the change between the modified measurement bone conduction signal and the baseline bone conduction signal, a pressure value for the pressure applied by the individual to the surface.

11. The computer-readable storage medium of claim 10, wherein the operations further comprise:
   generating a reference bone conduction signal;
   sending the reference bone conduction signal to the body of the individual, wherein the reference bone conduction signal propagates through the bone of the body of the individual and into the surface;
   receiving a modified reference bone conduction signal from the surface, wherein the modified reference bone conduction signal comprises the reference bone conduction signal after the reference bone conduction signal has propagated through and has been modified by the bone of the body of the individual and the surface; and
   saving the modified reference bone conduction signal as the baseline bone conduction signal.

12. The computer-readable storage medium of claim 10, wherein the operations further comprise:
   observing a plurality of pressure values for a plurality of pressures applied by the individual to the surface;
   determining, from the plurality of pressure values, a minimum observed pressure value and a maximum observed pressure value; and
   storing the minimum observed pressure value and the maximum observed pressure value in association with the surface and the individual.

13. The computer-readable storage medium of claim 10, wherein the operations further comprise:
   prompting the individual to perform an action to trigger a function;
   storing the pressure value associated with the pressure applied by the individual to the surface in association with the function;
   identifying a function degradation threshold for the function, the function degradation threshold comprising a threshold pressure;
   determining a subsequent pressure value associated with a subsequent pressure applied by the individual to the surface;
   determining that the subsequent pressure value associated with the subsequent pressure applied by the individual to the surface meets the function degradation threshold; and
   generating an alert directed to an entity to inform the entity that the function degradation threshold has been met.

\* \* \* \* \*